US012263680B2

(12) United States Patent
Ogawa et al.

(10) Patent No.: US 12,263,680 B2
(45) Date of Patent: Apr. 1, 2025

(54) LIQUID DISCHARGE APPARATUS

(71) Applicant: BROTHER KOGYO KABUSHIKI KAISHA, Nagoya (JP)

(72) Inventors: Mikio Ogawa, Nagoya (JP); Rikuto Mitoka, Nagoya (JP); Motoki Yamada, Ichinomiya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 132 days.

(21) Appl. No.: 18/069,463

(22) Filed: Dec. 21, 2022

(65) Prior Publication Data

US 2023/0271419 A1 Aug. 31, 2023

(30) Foreign Application Priority Data

Feb. 28, 2022 (JP) ................................ 2022-029223
Feb. 28, 2022 (JP) ................................ 2022-029628

(51) Int. Cl.
*B41J 2/165* (2006.01)
*B41J 2/175* (2006.01)
(Continued)

(52) U.S. Cl.
CPC ....... *B41J 2/16535* (2013.01); *B41J 2/16505* (2013.01); *B41J 2/16508* (2013.01); *B41J 2/16532* (2013.01); *B41J 2/16538* (2013.01); *B41J 2/16547* (2013.01); *B41J 2/16552* (2013.01); *B41J 2/175* (2013.01); *B41J 29/38* (2013.01); *B41J 2002/16558* (2013.01); *B41J 29/02* (2013.01); *B41J 29/13* (2013.01)

(58) Field of Classification Search
CPC ......................... B41J 2/16535; B41J 2/16505; B41J 2/16532; B41J 29/02; B41J 2/16547; B41J 2/175; B41J 29/38; B41J 2/16552; B41J 2002/16558; B41J 2/16508; B41J 2/16538; B41J 29/13
See application file for complete search history.

(56) References Cited

U.S. PATENT DOCUMENTS 5,905,514 A * 5/1999 Rhoads ................ B41J 2/16552 347/31
2012/0249673 A1* 10/2012 Mita .................... B41J 2/16552 347/33
(Continued)

FOREIGN PATENT DOCUMENTS

JP 2007007977 A * 1/2007 .............. B41J 2/165
JP 2010058338 A * 3/2010 .......... B41J 2/16538
(Continued)

*Primary Examiner* — Yaovi M Ameh
(74) *Attorney, Agent, or Firm* — Merchant & Gould P.C.

(57) ABSTRACT

There is provided a liquid discharge apparatus including a head configured to eject a liquid from nozzles being open in a nozzle surface, a liquid absorbing wiper, and a support supporting the liquid absorbing wiper. The supporter is movable relative to the head, between a first position where the liquid absorbing wiper is in contact with the nozzle surface, and a second position where the liquid absorbing wiper is away from the nozzle surface, the supporter has a flow channel for a liquid cleaner to flow therethrough, and the liquid absorbing wiper sucks in the liquid cleaner from below by way of contact with the liquid cleaner flowing in the flow channel.

16 Claims, 19 Drawing Sheets

(51) Int. Cl.

| | |
|---|---|
| ***B41J 29/38*** | (2006.01) |
| *B41J 29/02* | (2006.01) |
| *B41J 29/13* | (2006.01) |

(56) References Cited

U.S. PATENT DOCUMENTS

| | | | | |
|---|---|---|---|---|
| 2020/0376845 | A1* | 12/2020 | Furukawa ............ | B41J 2/16544 |
| 2022/0040982 | A1* | 2/2022 | You ...................... | B41J 2/16514 |

FOREIGN PATENT DOCUMENTS

| | | | |
|---|---|---|---|
| JP | 2018-83342 | A | 5/2018 |
| JP | 2019-198988 | A | 11/2019 |

* cited by examiner

LIQUID DISCHARGE APPARATUS

REFERENCE TO RELATED APPLICATIONS

This application claims priorities from Japanese Patent Application No. 2022-029223 filed on Feb. 28, 2022 and Japanese Patent Application No. 2022-029628 filed on Feb. 28, 2022. The entire contents of the priority applications are incorporated herein by reference.

BACKGROUND ART

There are known liquid discharge apparatuses ejecting a liquid from nozzles of a head to print on a sheet such as, for example, ink jet printers. Such a publicly known ink jet printer includes an ink head to eject an ink onto a recording medium, and a wiper to wipe a nozzle surface of the ink head. A wiper moving mechanism rotates the wiper to immerse the same into a liquid cleaner retained in a liquid cleaner sink. The wiper immersed in the liquid cleaner is disposed to a cleaning position by the wiper moving mechanism. In this state, by moving a carriage mounted with the ink head, dirt and the like are wiped away by the wiper from the nozzle surface of the ink head.

DESCRIPTION

In the above publicly known ink jet printer, because the liquid cleaner sink and the wiper moving mechanism are provided for each wiper, the apparatus is liable to upsizing.

An object of the present disclosure is to provide a liquid discharge apparatus capable of sufficiently immersing a liquid absorbing wiper in a liquid cleaner while facilitating downsizing.

According to an aspect of the present disclosure, there is provided a liquid discharge apparatus including: a head; a liquid absorbing wiper; and a support. The head is configured to discharge a liquid from a nozzle opening in a nozzle surface. The support is configured to support the liquid absorbing wiper. The support is configured to move relative to the head, between a first position and a second position. The liquid absorbing wiper is in contact with the nozzle surface at the first position, and the liquid absorbing wiper is away from the nozzle surface at the second position. The support includes a flow channel configured to flow a liquid cleaner therethrough. The liquid absorbing wiper is configured to absorb the liquid cleaner from below by contacting with the liquid cleaner flowing in the flow channel.

When the liquid cleaner flowing through the flow channel comes to contact with the liquid absorbing wiper, the liquid cleaner is sucked into the liquid absorbing wiper. Therefore, the liquid absorbing wiper is sufficiently impregnated with the liquid cleaner without rotating the liquid absorbing wiper.

According to the present disclosure, it is possible to realize a compact apparatus for impregnating the liquid absorbing wiper with the liquid cleaner.

FIG. 1 is a perspective view of an outer appearance of an image recording apparatus 100.

FIG. 2 is a cross section view depicting the cross section II-II of FIG. 1, and depicting a state with a head 38 in a recording position, a first support mechanism 51 in a first posture, and a maintenance mechanism 60 in a standby position.

Figure 1:
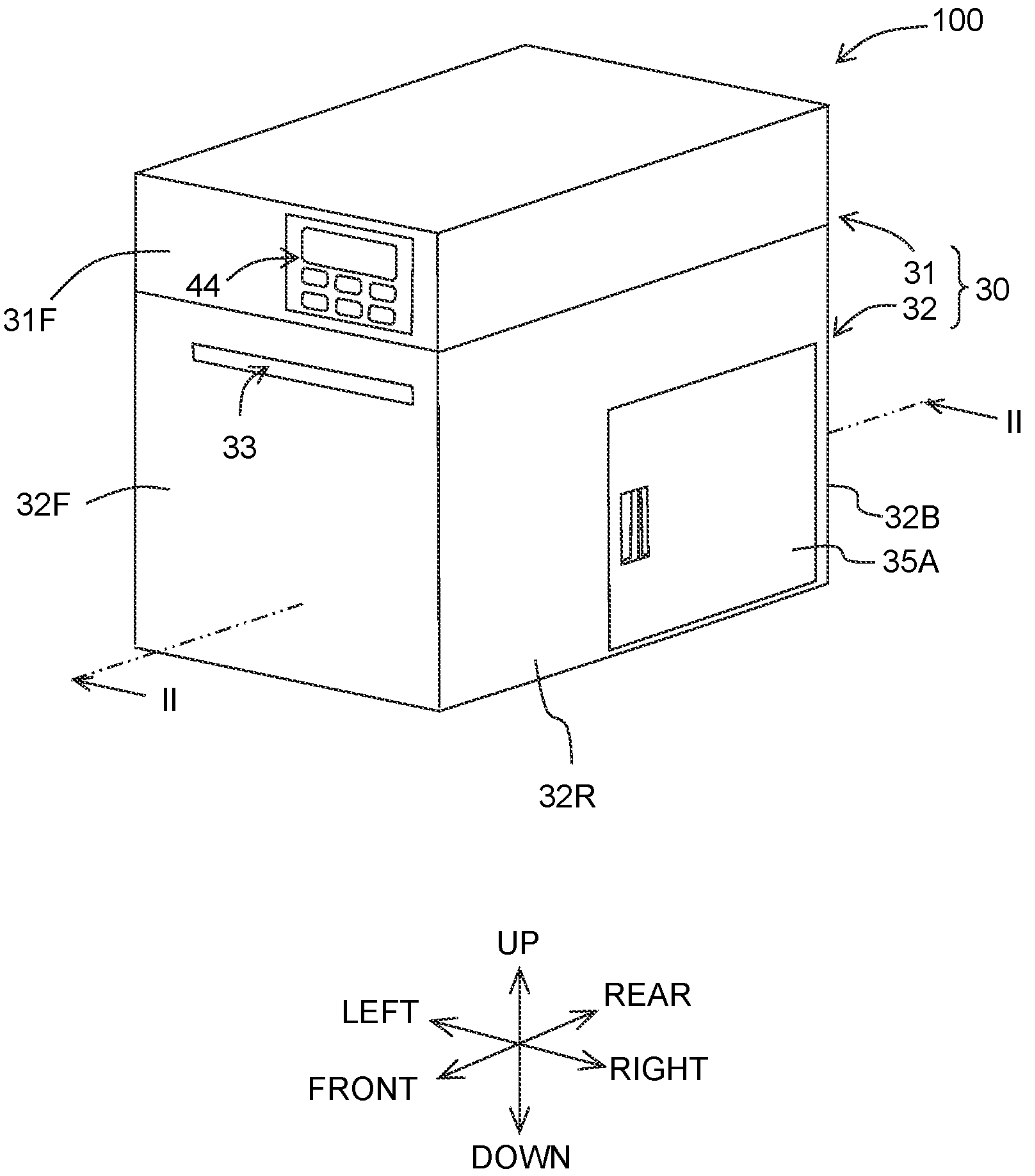
Figure 13:
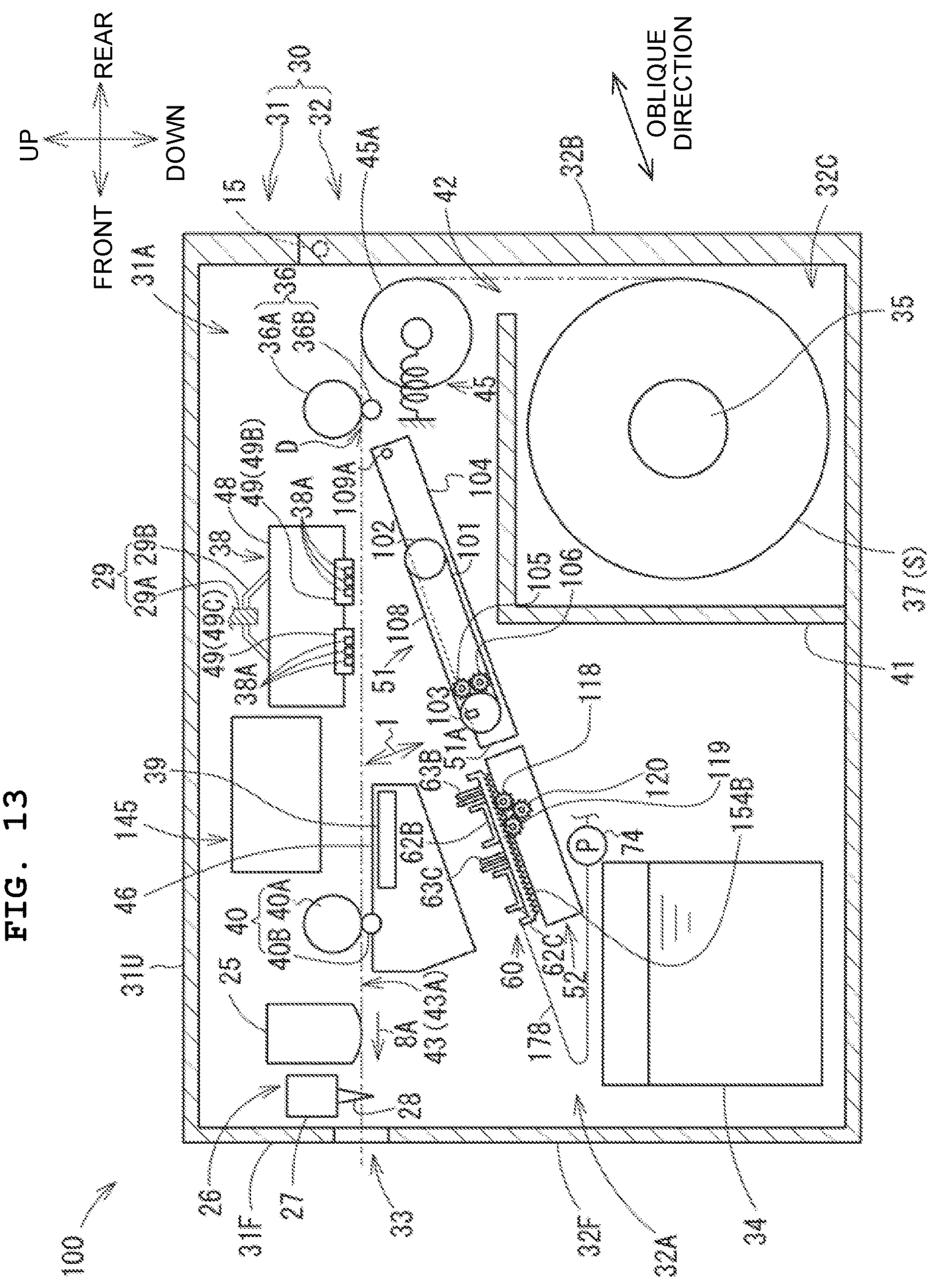

FIG. 13 is a cross section view depicting the cross section II-II of FIG. 1, and depicting a state with the head 38 in the recording position, the first support mechanism 51 in the second posture, and the maintenance mechanism 60 in the standby position.

Figure 14:
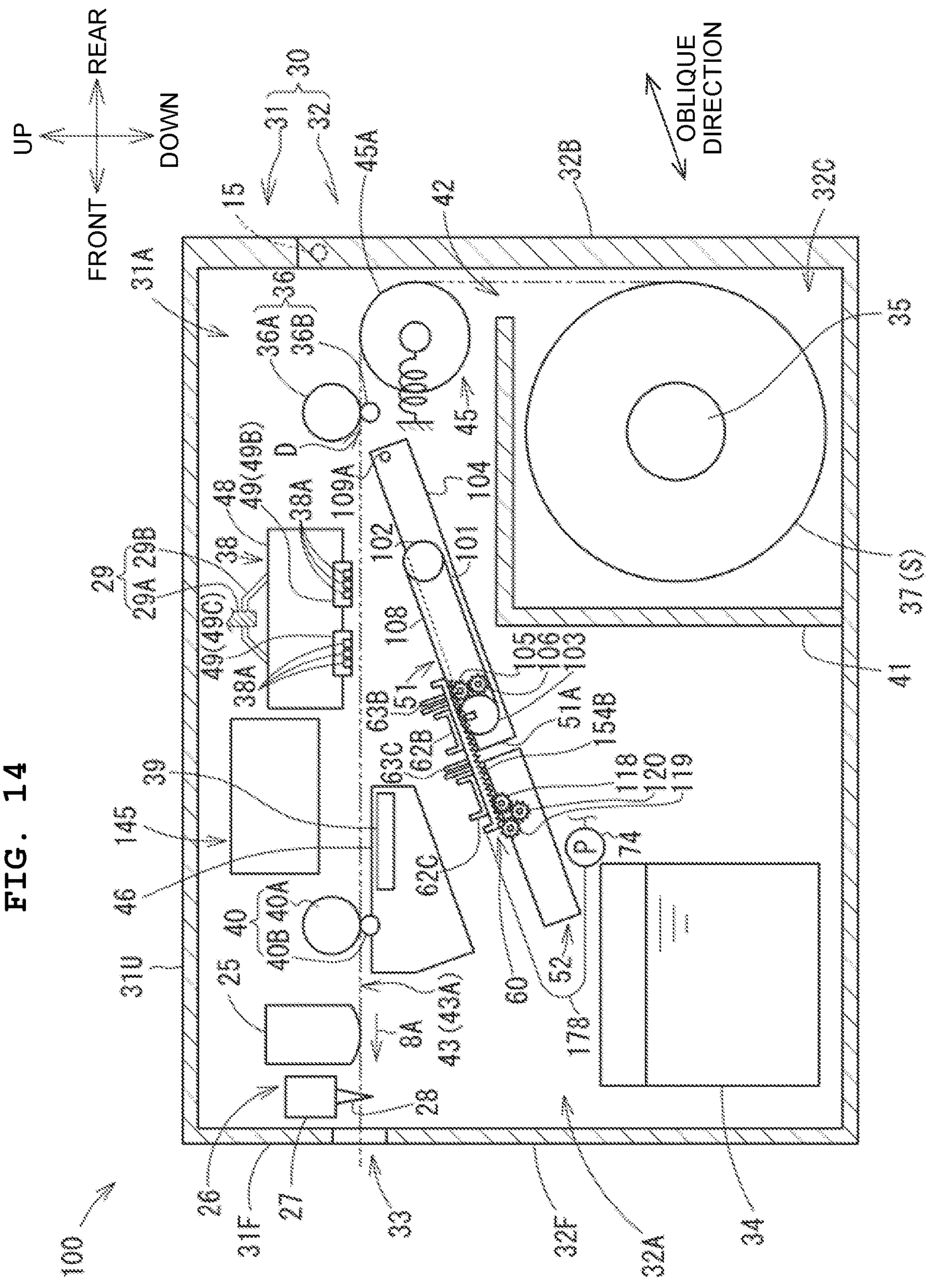

FIG. 14 is a cross section view depicting the cross section II-II of FIG. 1, and depicting a state with the head 38 in the recording position, the first support mechanism 51 in the second posture, and the maintenance mechanism 60 in a position between the standby position and a maintenance position.

Figure 15:
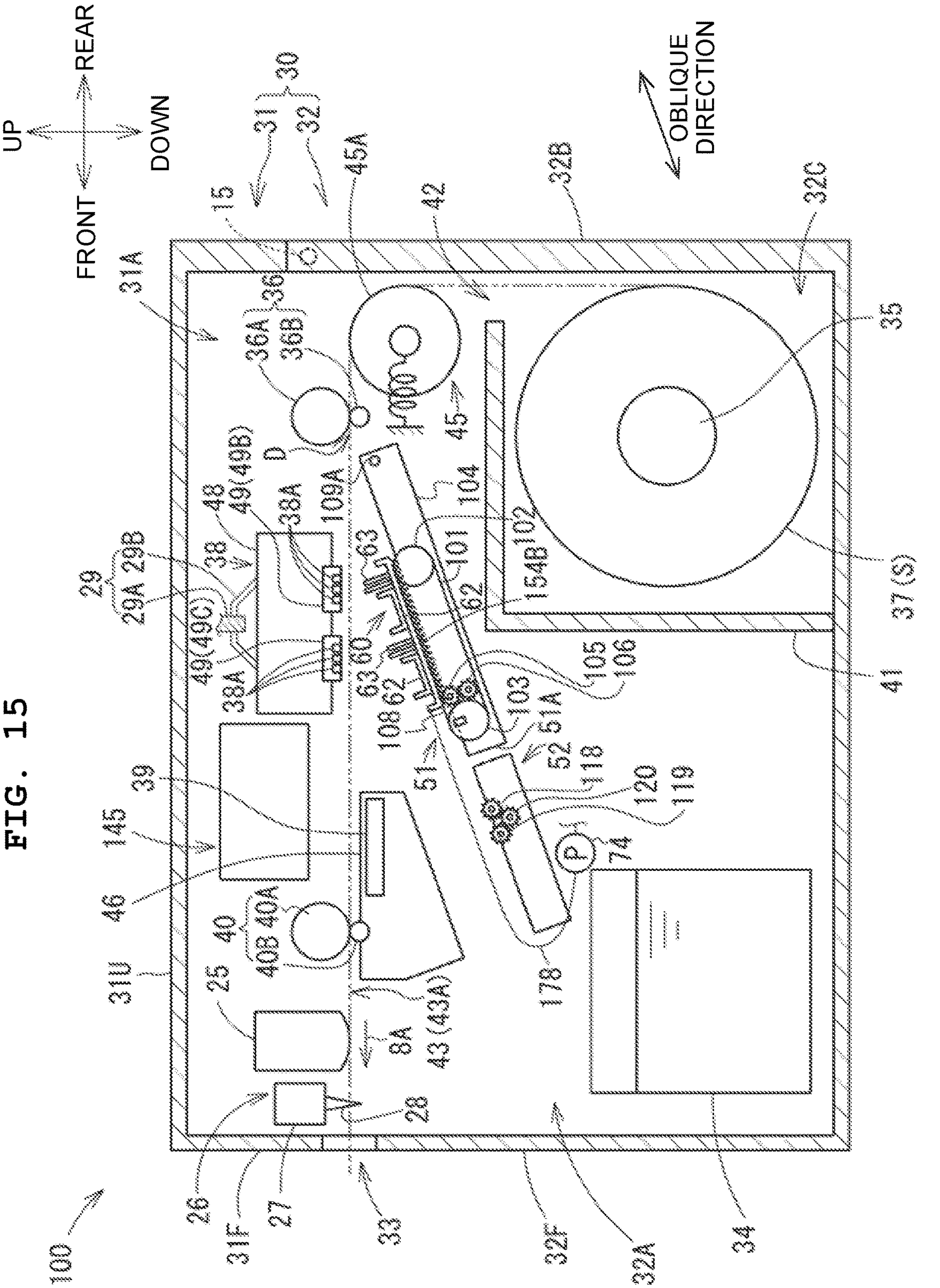

FIG. 15 is a cross section view depicting the cross section II-II of FIG. 1, and depicting a state with the head 38 in the recording position, the first support mechanism 51 in the second posture, and the maintenance mechanism 60 in a position supported by the first support mechanism 51.

Figure 16:
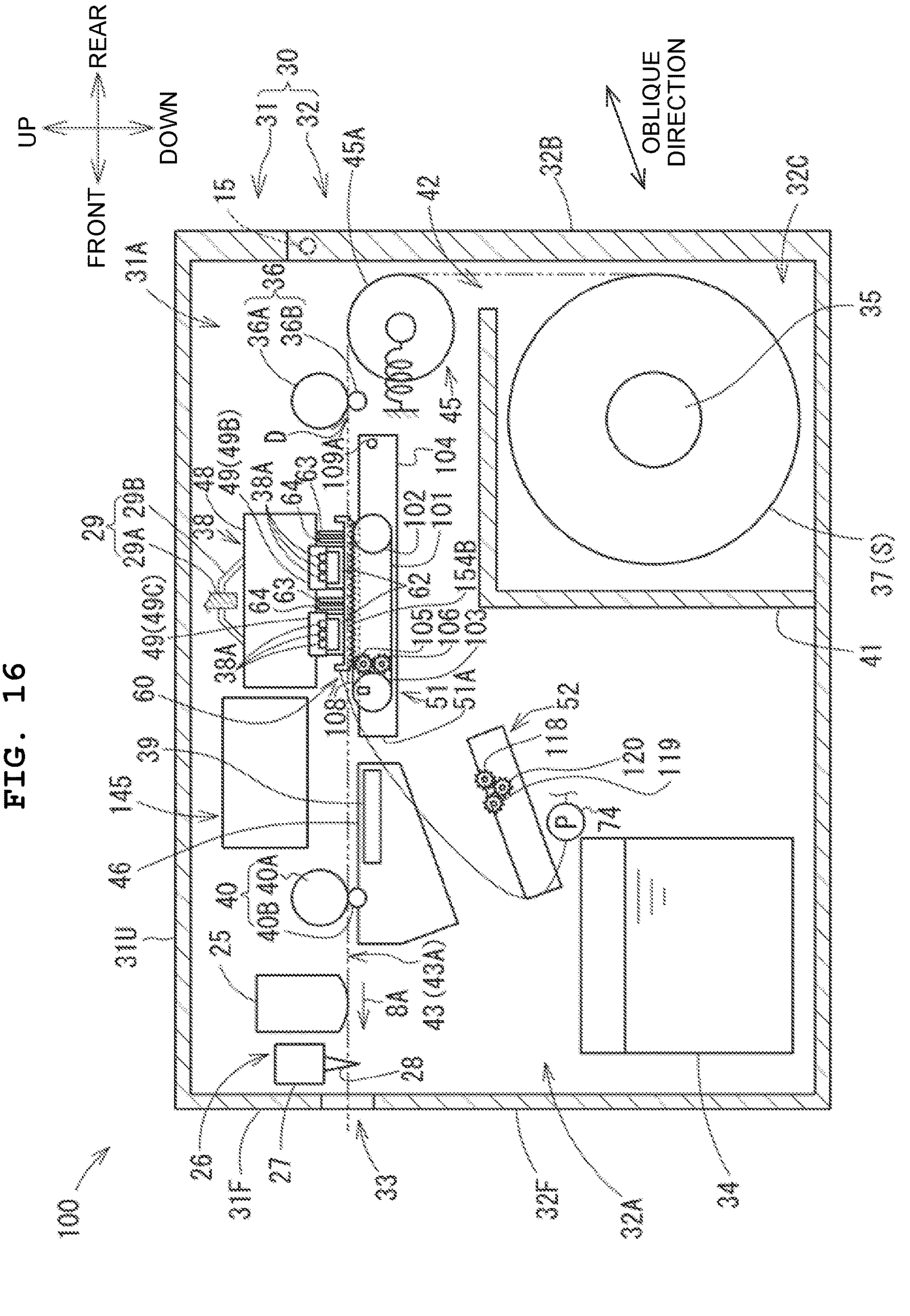

FIG. 16 is a cross section view depicting the cross section II-II of FIG. 1, and depicting a state with the head 38 in a capped position, the first support mechanism 51 in the first posture, and the maintenance mechanism 60 in the maintenance position.

Figure 17:
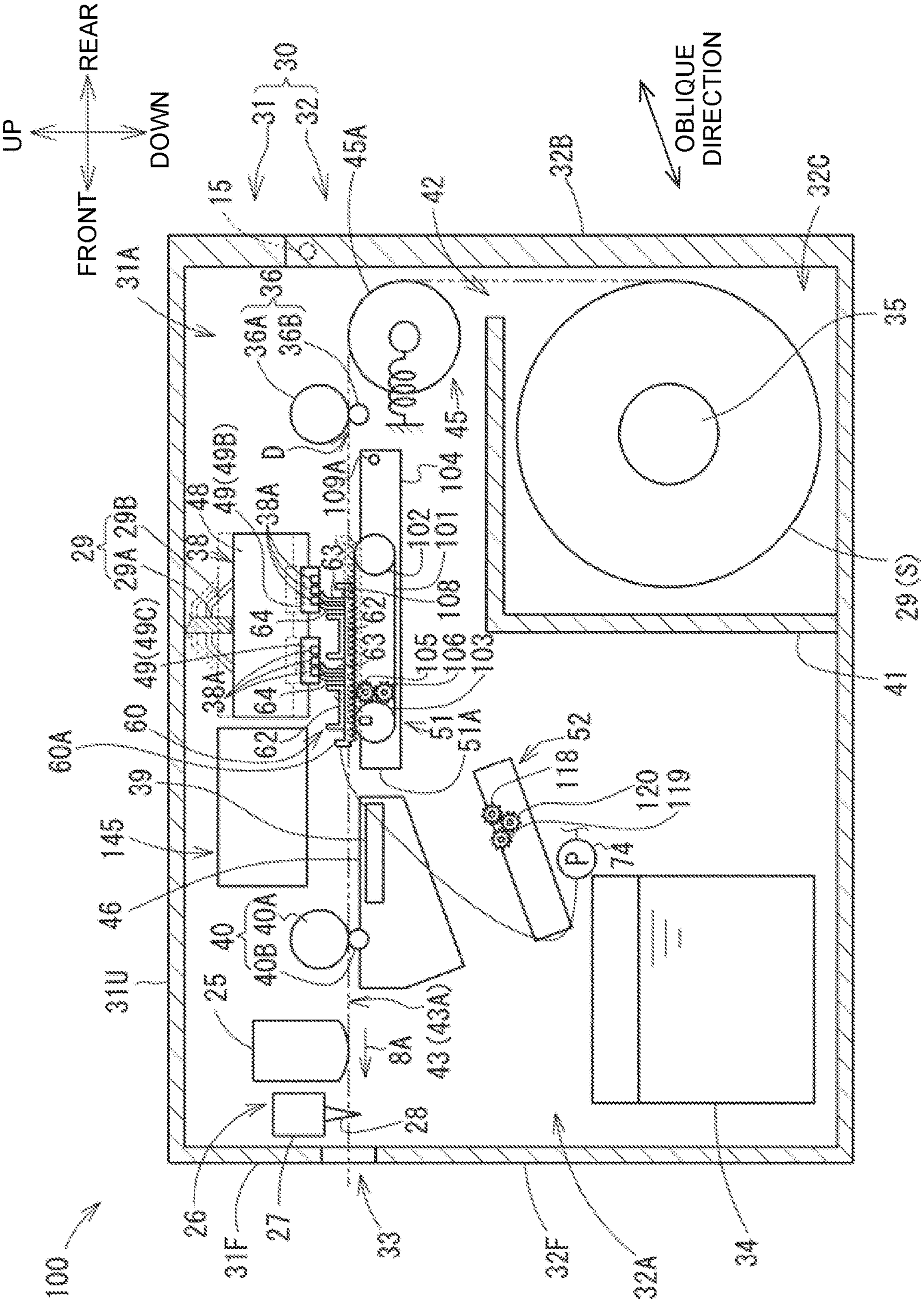

FIG. 17 is a cross section view depicting the cross section II-II of FIG. 1, and depicting a state with the head 38 in a wiped position, the first support mechanism 51 in the first posture, and the maintenance mechanism 60 in a wiping position.

Figure 18:
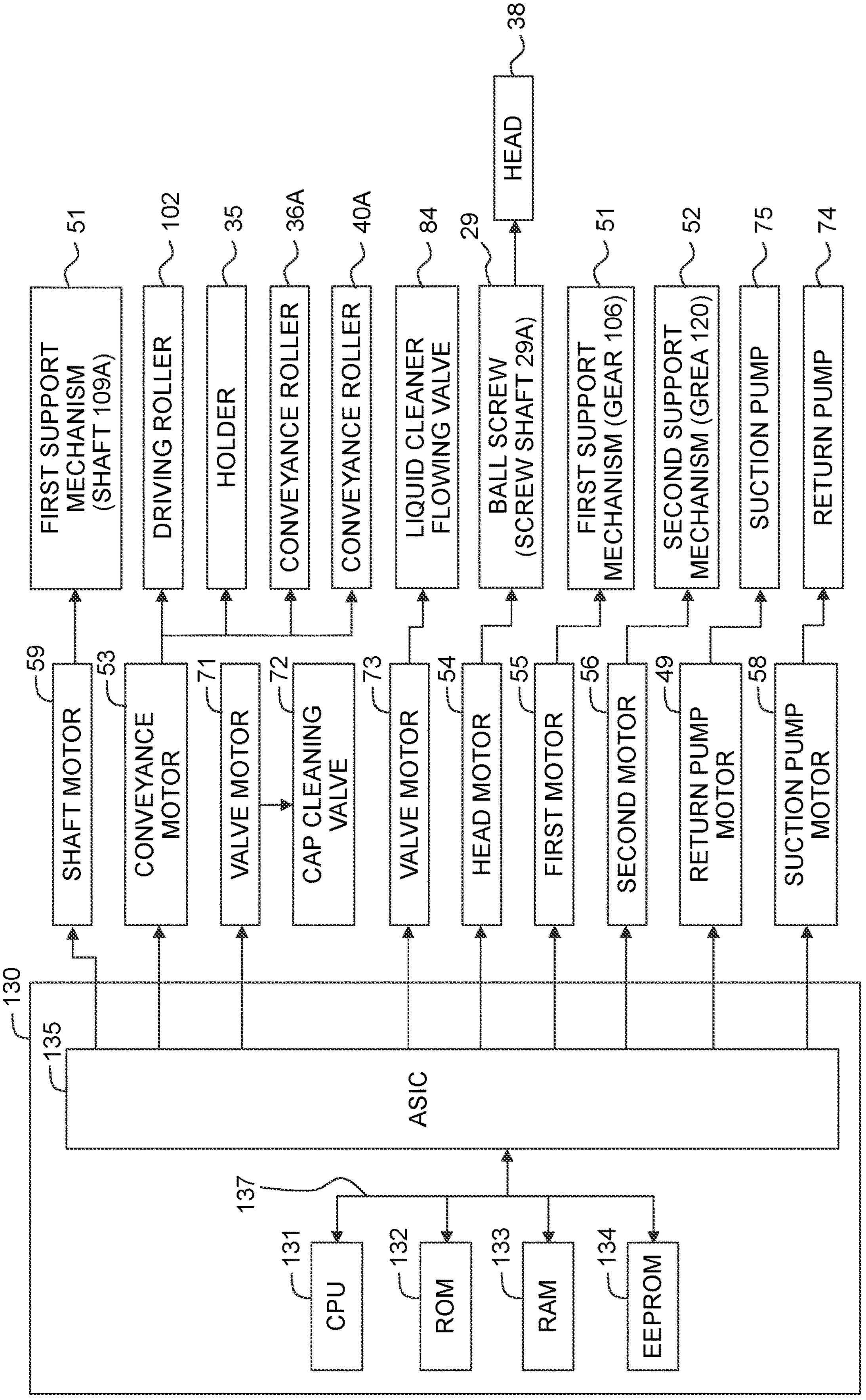

FIG. 18 is a block diagram of the image recording apparatus 100.

Figure 19:
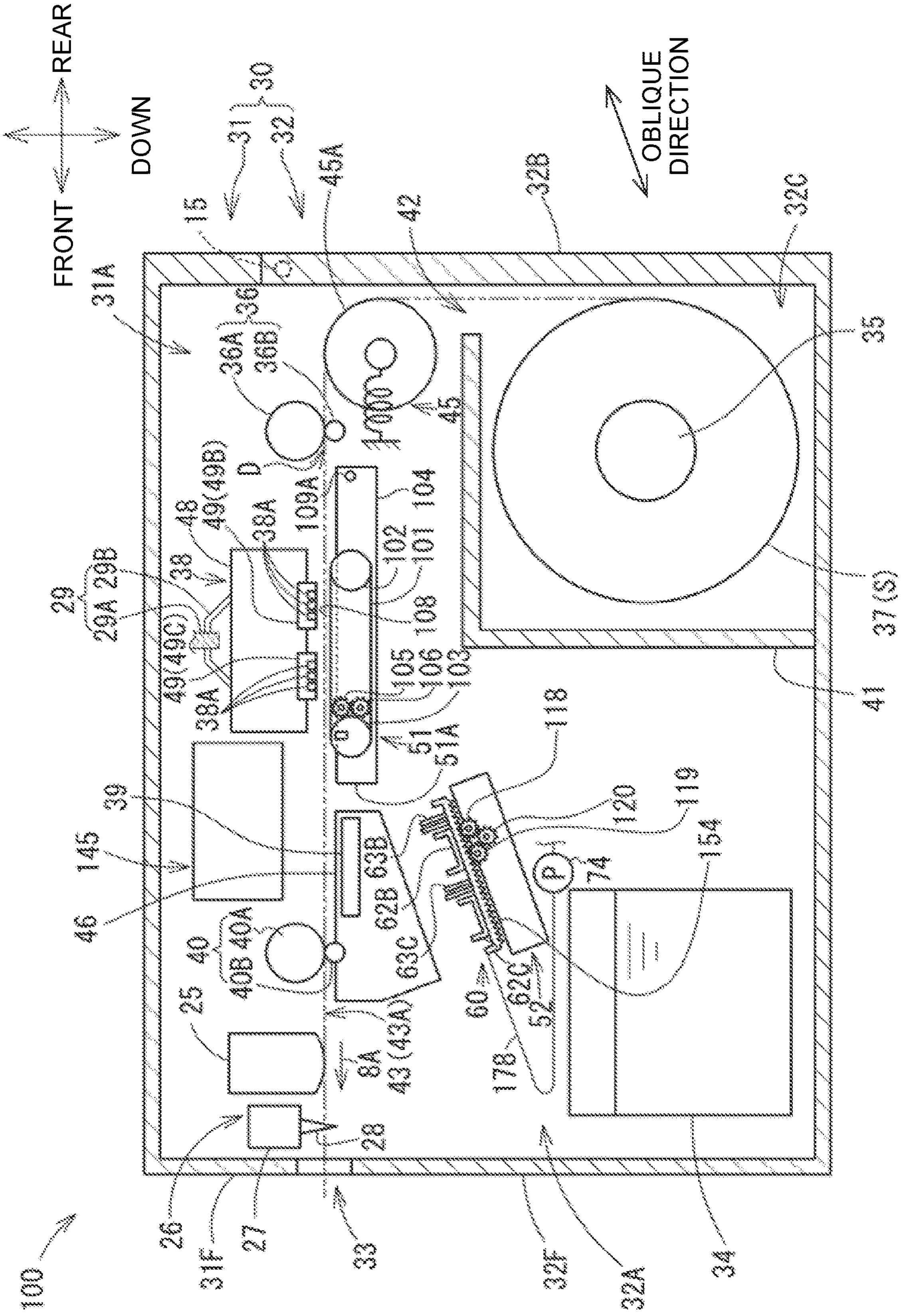

FIG. 19 is a cross section view depicting the cross section II-II of FIG. 1, and depicting a state with the head 38 in a recording position, the first support mechanism 51 in the first posture, and the maintenance mechanism 60 in a standby position.

An embodiment of the present disclosure will be explained below. Note that, needless to say, this embodiment presents merely one aspect of the present disclosure, and can undergo changes and modifications without departing from the true spirit and scope of the present disclosure. Further, in the following explanation, an up-down direction is defined on such a reference as with an image recording apparatus 100 being placed in a usable condition (the state of FIG. 1), a front-rear direction is defined regarding the side where a discharge port 33 is provided as the near side (or the front side), and a left-right direction is defined when the image recording apparatus 100 is viewed from the near side (the front side).

<Outer Appearance Configuration of the Image Recording Apparatus 100>

The image recording apparatus 100 (an example of the liquid discharge apparatus) depicted in FIG. 1 is configured to record an image on a sheet S of a roll 37 (see FIG. 2) by an ink jet recording method As depicted in FIG. 1, the image recording apparatus 100 includes a casing 30. The casing 30 includes an upper casing 31 and a lower casing 32. The upper casing 31 and the lower casing 32 are shaped into an approximate cuboid as a whole, and sized as disposable on a desk. That is, the image recording apparatus 100 is suitable to be placed on a desk for use. Of course, the image recording apparatus 100 may also be placed on a floor or rack for use.

Figure 2:
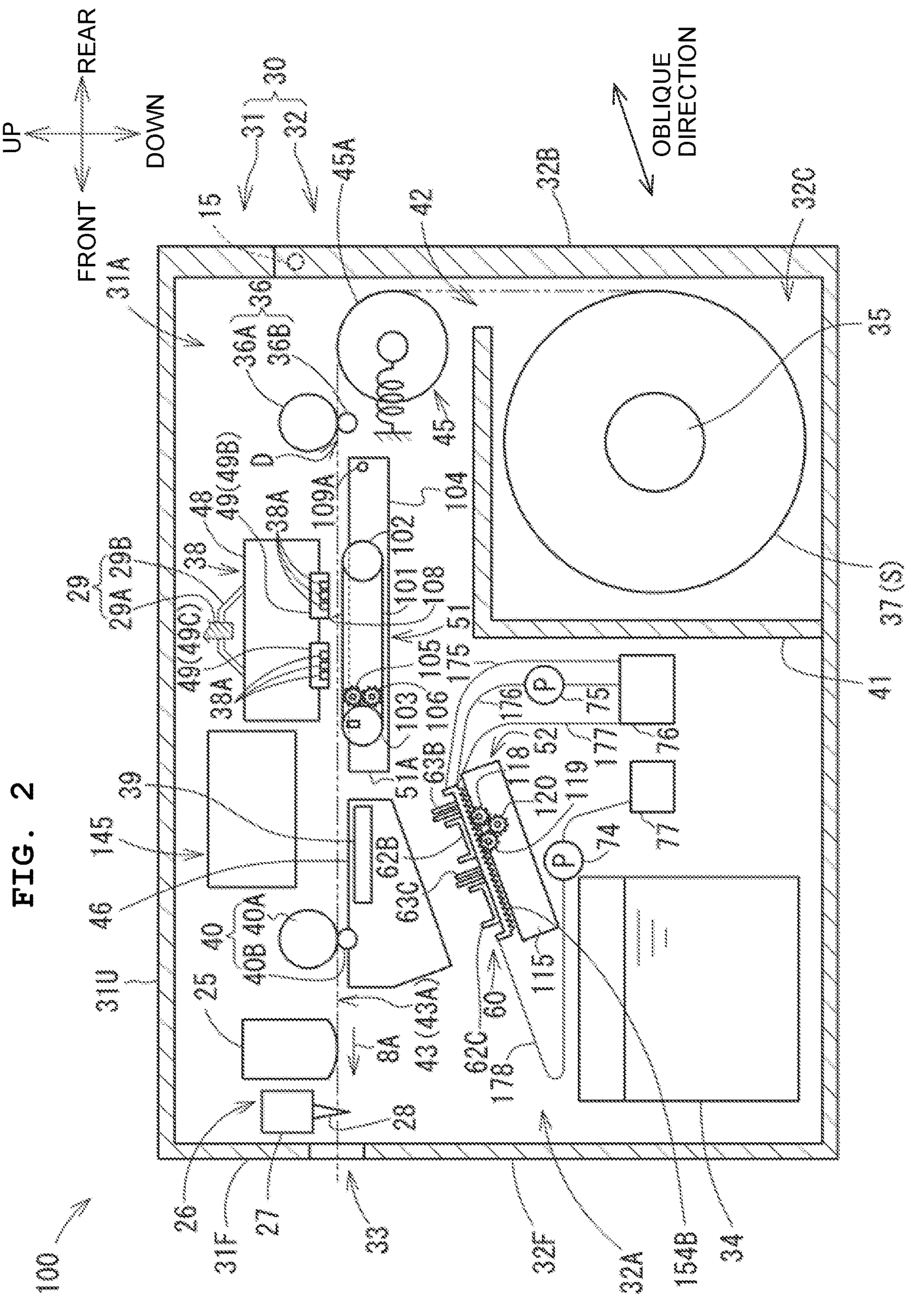

As depicted in FIG. 2, the upper casing 31 is supported by the lower casing 32 in a rotatable manner. The upper casing 31 is rotatable between a closed position depicted in FIG. 2 and an opened position depicted in FIG. 3 about a rotating shaft 15 provided at the lower end at the rear side to extend in the left-right direction. Note that the upper casing 31 is not limited to the configuration of rotating on the rotating shaft 15 but may be rotate on a hinge or the like, for example.

Figure 3:
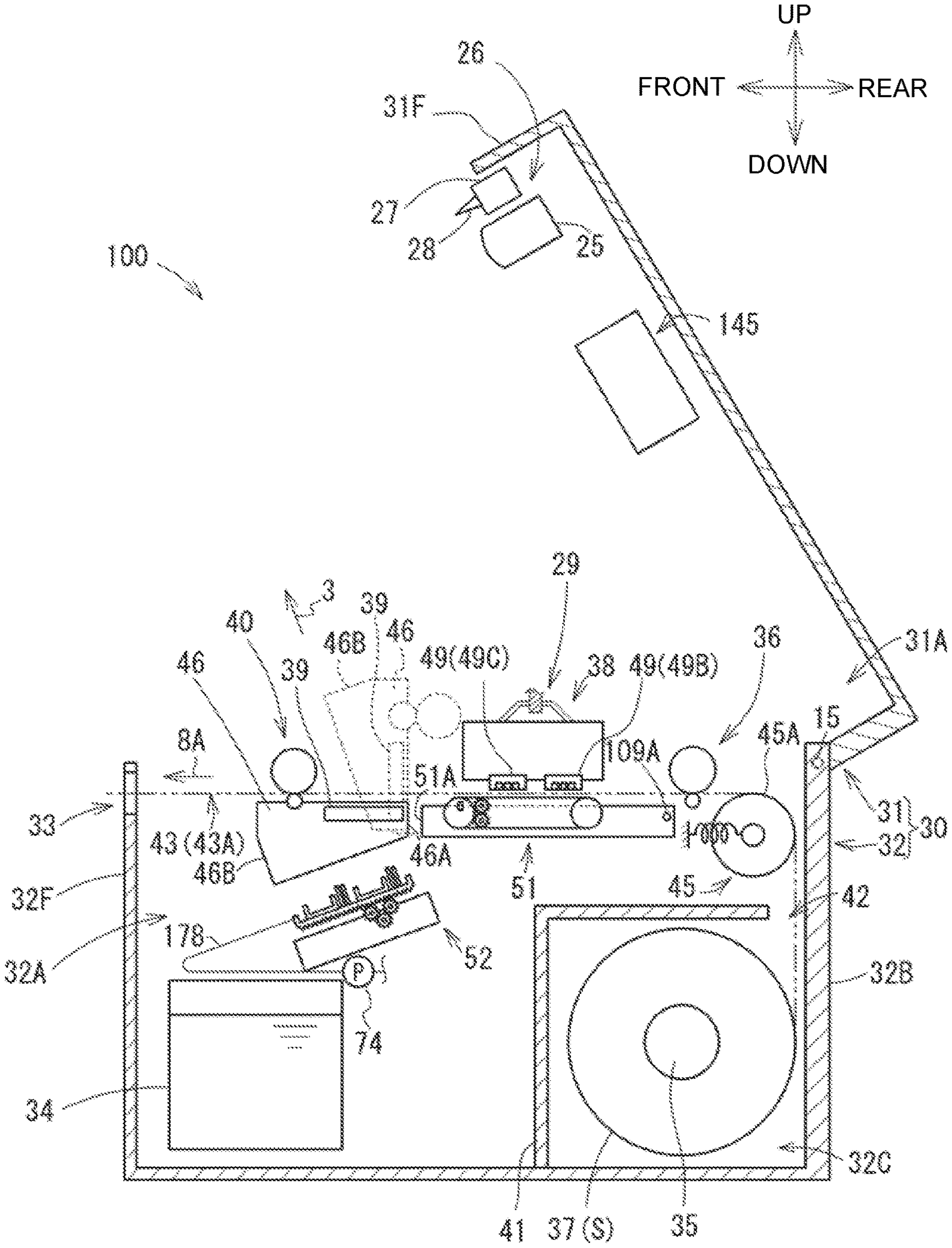
FIG. 3 is a cross section view depicting a state of an upper casing 31 turned into an opened position in FIG. 2.

As depicted in FIG. 2, when the upper casing 31 is in the closed position, an internal space 31A of the upper casing 31 and an internal space 32A of the lower casing 32 are unexposed to the outside. As depicted in FIG. 3, when the upper casing 31 is in the opened position, the internal space 31A of the upper casing 31 and the internal space 32A of the lower casing 32 are exposed to the outside.

As depicted in FIG. 1, a front surface 32F of the lower casing 32 is formed with the slit-like discharge port 33 elongated in the left-right direction. The sheet S (see FIG. 2) finished with image recording is discharged from the discharge port 33.

A front surface 31F of the upper casing 31 is provided with an operation panel 44. A user can use the operation panel 44 for inputs in order to operate the image recording apparatus 100 and determine various settings.

<Internal Configuration of the Image Recording Apparatus 100>

As depicted in FIG. 2, in the internal spaces 31A and 32A, there are arranged a holder 35, a tensioner 45, a conveyance roller pair 36, a conveyance roller pair 40, a head 38, a first support mechanism 51, a heater 39 (an example of the fixing part), a supporting member 46, a second support mechanism 52, a CIS 25, a cutter unit 26, an ink tank 34, a liquid cleaner tank 76, a waste liquid tank 77, and a maintenance mechanism 60. Without illustration in FIG. 2, in the internal space 32A, a controller 130 is arranged (see FIG. 18). The controller 130 serves to control the operation of the image recording apparatus 100.

A partition wall 41 is provided in the internal space 32A. The partition wall 41 partitions a rear lower part of the lower casing 32 to define the sheet accommodation space 32C. The sheet accommodation space 32C is enclosed by the partition wall 41 and the lower casing 32 to become a space secluded from the head 38 and the like.

The roll 37 is accommodated in the sheet accommodation space 32C. The roll 37 has a core pipe and the elongate sheet S. The sheet S is rolled around the core pipe into a roll shape in a circumferential direction of the axial core of the core pipe. The sheet S may be as wide as from the minimum width to the maximum width at which the image recording apparatus 100 can record images. That is, the sheet accommodation space 32C can accommodate the roll 37 of a plurality of types with different widths. Note that the roll 37 may not have a core pipe such that the sheet S may be rolled on the holder 35 in a removable manner into a roll shape. Further, the sheet accommodation space 32C may also accommodate fanfold paper. As depicted in FIG. 1, a right cover 35A is positioned in a right surface 32R of the lower casing 32. The right cover 35A is opened and closed to expose and shield the holder 35 and the like positioned in the sheet accommodation space 32C.

As depicted in FIG. 2, the holder 35 is positioned in the sheet accommodation space 32C to extend along the left-right direction. The holder 35 supports the roll 37 such that the roll 37 can rotate about the axial core in the circumferential direction, the axial core of the core pipe of the roll 37 being along the left-right direction, on the occasion of installation. A driving force is transmitted from a conveyance motor 53 (an example of the driver; see FIG. 18) to the holder 35 to rotate the same. Along with the rotation of the holder 35, the roll 37 supported on the holder 35 also rotates.

As depicted in FIG. 2, the sheet accommodation space 32C is open upward at the rear side. In detail, an interspace 42 is formed between the partition wall 41 and a rear surface 32B, that is, in an upper part at the rear side of the roll 37. The conveyance roller pairs 36 and 40 rotate to pull out the sheet S upward from the rear end of the roll 37 and guide the same to a tensioner 45 via the interspace 42.

The tensioner 45 is positioned above the partition wall 41 in a rear part of the internal space 32A. The tensioner 45 has an outer circumference 45A facing the outside of the lower casing 32. The outer circumference 45A is sized to be larger than the maximum width of the sheet in the left-right direction, and shaped symmetrically to the center of paper passage. The upper end of the outer circumference 45A is positioned at almost the same vertical level as a nip D of the conveyance roller pair 36 in the up-down direction.

The sheet S pulled out from the roll 37 is brought on in contact with the outer circumference 45A. The sheet S is curved frontward along the outer circumference 45A, extending in a conveyance orientation 8A to be guided to the conveyance roller pair 36. The conveyance orientation 8A is a frontward orientation along the front-rear direction. The tensioner 45 applies a tension to the sheet S by a publicly known method.

The conveyance roller pair 36 is positioned in front of the tensioner 45. The conveyance roller pair 36 has a conveyance roller 36A and a pinch roller 36B. The conveyance roller 36A is in contact with the pinch roller 36B at almost the same vertical level as the upper end of the outer circumference 45A to form a nip D.

The conveyance roller pair 40 is positioned in front of the conveyance roller pair 36. The conveyance roller pair 40 has a conveyance roller 40A and a pinch roller 40B. The conveyance roller 40A is in contact with the pinch roller 40B at almost the same vertical level as the upper end of the outer circumference 45A to form another nip.

A driving force is transmitted from the conveyance motor 53 (see FIG. 18) to the conveyance rollers 36A and 40A to rotate the same. The conveyance roller pair 36 in rotation nips the sheet S extending from the tensioner 45 in the conveyance orientation 8A to send out the same in the conveyance orientation 8A along a conveyance surface 43A. The conveyance roller pair 40 in rotation nips the sheet S sent out from the conveyance roller pair 36 to send out the same in the conveyance orientation 8A. Further, the conveyance roller pairs 36 and 40 rotate to pull out the sheet S toward the tensioner 45 through the interspace 42 from the sheet accommodation space 32C.

As depicted in FIG. 2, a conveyance path 43 is formed in the internal space 32A from the upper end of the outer circumference 45A to the discharge port 33. The conveyance path 43 is a space through which the sheet S is passable, extending almost linearly along the conveyance orientation 8A. In detail, the conveyance path 43 expands in the conveyance orientation 8A and the left-right direction and along the long conveyance surface 43A in the conveyance orientation 8A. Note that in FIG. 2, the conveyance surface 43A is depicted with a two-dot chain line in depicting the conveyance path 43. The conveyance path 43 is defined by guide members (not shown) positioned apart from each other in the up-down direction, the head 38, a conveyance belt 101, the supporting member 46, the heater 39, and the like. That is, the head 38, the conveyance belt 101, the supporting member 46, and the heater 39 are positioned along the conveyance path 43.

The head 38 is positioned downstream from the conveyance roller pair 36 in the conveyance orientation 8A and above the conveyance path 43. The head 38 has a plurality of nozzles 38A. From the plurality of nozzles 38A, an ink is ejected downward toward the sheet S supported by the conveyance belt 101. By virtue of this, image is recorded on the sheet S. The configuration of the head 38 will be explained in detail later on.

The first support mechanism 51 is positioned below the conveyance path 43 at the downstream side of the conveyance roller pair 36 in the conveyance orientation 8A. The first support mechanism 51 faces the head 38 from below the head 38. The first support mechanism 51 has the conveyance belt 101 and a supporter 104. The conveyance belt 101 supports the sheet S positioned right below the head 38 and conveyed by the conveyance roller pair 36 in the conveyance orientation 8A. The conveyance belt 101 conveys the supported sheet S in the conveyance orientation 8A. The supporter 104 can support the maintenance mechanism 60. The configuration of the first support mechanism 51 will be explained in detail later on.

The heater 39 is positioned below the conveyance path 43 at the upstream side of the conveyance roller pair 40 in the conveyance orientation 8A but at the downstream side of the head 38 in the conveyance orientation 8A. The heater 39 is supported on the frame in front of the first support mechanism 51 to extend in the left-right direction. The heater 39 has a heat-transfer plate (not shown) and a film heater (not shown). The heat-transfer plate is made of a metal, having almost the same vertical position as a conveyance surface 108 of the conveyance belt 101. The sheet S sent out from the first support mechanism 51 is conveyed frontward on the support surface of the heat-transfer plate. The film heater is fixed on the lower surface of the heat-transfer plate, and emits heat under the control of the controller 130. The heat transfers to the sheet S on the heat-transfer plate via the heat-transfer plate.

The heat from the heater 39 is recovered by a duct 145 arranged above the heater 39. The duct 145 is arranged above the conveyance path 43 at the downstream side of the head 38 but at the upstream side of the conveyance roller pair 40 in the conveyance orientation 8A.

The supporting member 46 is positioned below the conveyance path 43. The supporting member 46 is positioned at the downstream side of the head 38 and the first support mechanism 51 in the conveyance orientation 8A. The heater 39 is positioned at the rear side of the supporting member 46. The supporting member 46 faces the conveyance roller 40A on the front side. The supporting member 46 supports the sheet S conveyed there by the conveyance belt 101 of the first support mechanism 51 in the conveyance orientation 8A.

The supporting member 46 is supported on the lower casing 32 to be evolvable about a shaft (not shown) extending in the left-right direction. As depicted in FIG. 3, when the upper casing 31 is in the opened position, the supporting member 46 is rotatable between a fall-down position depicted with the solid line in FIG. 3, and a stand-up position depicted with the broken line in FIG. 3.

When the supporting member 46 is in the fall-down position, a leading end 46B of the supporting member 46 is positioned in front (at the downstream in the conveyance orientation 8A) of a base end 46A. When the supporting member 46 is in the fall-down position, the supporting member 46 constitutes part of the conveyance path 43 and can support the sheet S conveyed there by the conveyance belt 101 in the conveyance orientation 8A. When the supporting member 46 is in the stand-up position, the leading end 46B of the supporting member 46 is positioned higher than that when the supporting member 46 is in the fall-down position. Therefore, the maintenance mechanism 60 can be exposed to the outside.

Note that in this embodiment, the shaft of the supporting member 46 is provided at the rear end of the supporting member 46 to extend in the left-right direction. However, without being limited to that, for example, the shaft of the supporting member 46 may be provided at the front end of the supporting member 46 to extend in the left-right direction. Further, for example, the shaft of the supporting member 46 may extend in the front-rear direction.

The second support mechanism 52 is positioned below the supporting member 46 and fixed inside the lower casing 32 by being supported by the lower casing 32. The second support mechanism 52 can support the maintenance mechanism 60. The configuration of the first support mechanism 51 will be explained in detail later on.

The CIS 25 is positioned above the conveyance path 43 at the downstream side of the conveyance roller pair 40 in the conveyance orientation 8A. The CIS 25 serves to output an electrical signal according to the intensity of a ray of reflected light received by a line sensor by way of collecting the reflected light radiated from a light source such as LED or the like and reflected from the sheet, into the line sensor via a graded-index lens or the like. By virtue of this, the CIS 25 can read in the image on the printed surface of the sheet. The CIS 25 is arranged with the read-in line along the left-right direction.

The cutter unit 26 is positioned above the conveyance path 43 at the downstream side of the CIS 25 in the conveyance orientation 8A. In the cutter unit 26, a cutter 28 is mounted on a cutter carriage 27. The cutter carriage 27 moves along the conveyance path 43 in the left-right direction due to an unshown belt driving mechanism or the like. The cutter 28 is positioned across the conveyance path 43 in the up-down direction to move along the conveyance path 43 in the left-right direction together with the cutter carriage 27 in motion. With the cutter 28 in motion, the sheet S positioned in the conveyance path 43 is cut up along the left-right direction.

The ink tank 34 retains the ink. The ink is a liquid containing a pigment and the like. The ink has a viscosity suitable for uniform dispersion of the pigment. The pigment serves to render a color to the ink. The ink is supplied from the ink tank 34 to the head unit 38 through an unshown tube.

The liquid cleaner tank 76 retains a liquid cleaner (also referred to as an impregnating fluid). The liquid cleaner is used in cleaning the nozzles 38A of the head 38. The waste liquid tank 77 is used for retaining the liquid cleaner as a waste liquid having been used for cleaning the nozzles 38A.

The liquid cleaner liquid tank 76 is positioned below the aftermentioned second support mechanism 52. The liquid cleaner tank 76 is formed with an unshown atmosphere communication channel for communication between the outside and an air layer formed in the tank. The liquid cleaner tank 76 has a liquid cleaner flow valve (an example of the valve) to open and close an atmosphere communication channel 83. The waste liquid tank 77 is a container for the discharged liquid cleaner L. Note that in FIGS. 13 to 17 and FIG. 19, description of the liquid cleaner tank 76 and the waste liquid tank 77 is omitted.

The maintenance mechanism 60 serves for maintaining the head 38. The maintenance mechanism 60 is configured to be movable and moved right below the head 38 when the maintenance is carried out for the head 38 (see FIG. 16).

The maintenance of the head 38 includes a purge process, an immersion process, a wiping process, and the like. The purge process serves, as depicted in FIG. 16, to suck the ink from the nozzles 38A with a first suction pump 74 with the nozzles 38A being covered by a cap 62 of the maintenance mechanism 60. The immersion process serves to immerse the nozzles 38A in the liquid cleaner supplied to the cap 62 with the nozzles 38A being covered by the cap 62. As depicted in FIG. 17, the wiping process serves to wipe a lower surface 50 (an example of the nozzle surface) of an ejection module 49 of the head 38 with a sponge wiper 64 (an example of the liquid-absorbing wiper) and a rubber wiper 63 of the maintenance mechanism 60. The configuration of the maintenance mechanism 60 will be explained in detail later on.

<The Head 38>

Figure 4:
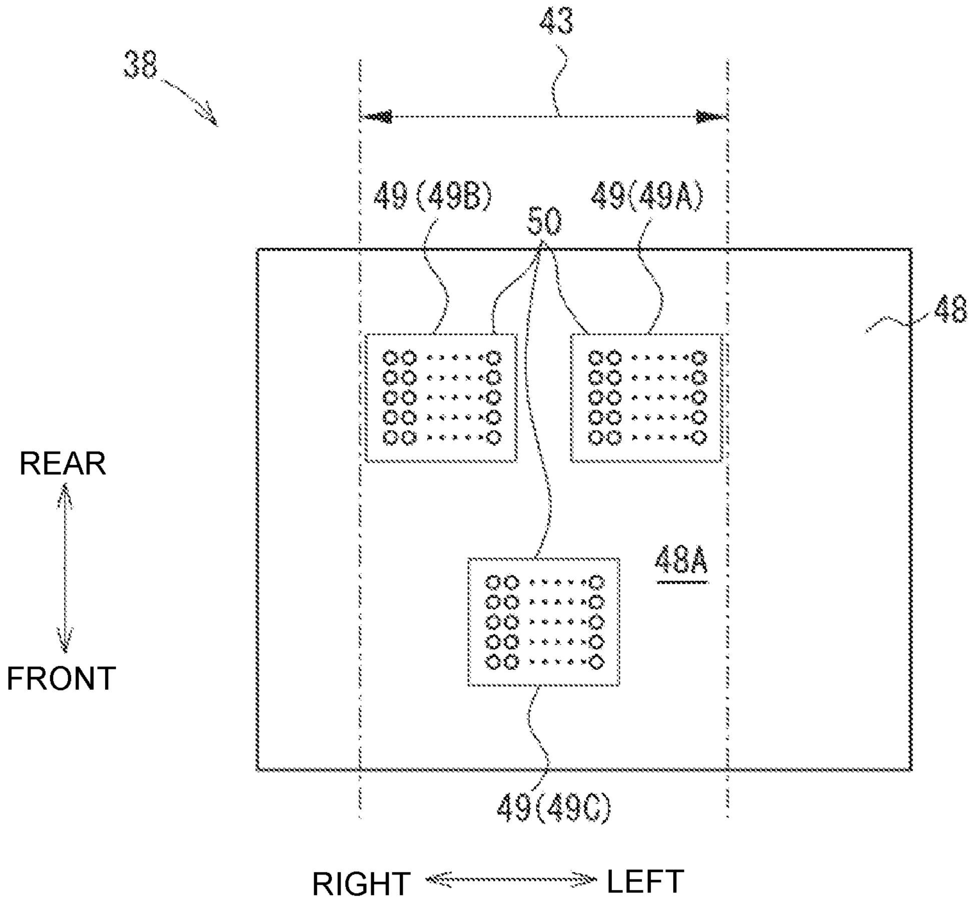
FIG. 4 is a bottom view of the head 38.

The head 38 depicted in FIGS. 2 and 4 is an approximate cuboid elongate in the left-right direction. As depicted in FIGS. 2 and 4, the head 38 includes a frame 48, and three ejection modules 49A, 49B, and 49C. Hereinbelow, the three ejection modules 49A, 49B, and 49C will also be referred to collectively as an ejection module 49. Note that the number of ejection modules 49 is not limited to three.

The frame 48 is fixed on the lower casing 32. As depicted in FIG. 4, the frame 48 is arranged across from the right side of the conveyance path 43 to the left side of the conveyance path 43.

As depicted in FIGS. 2 and 4, the ejection module 49 is supported by the frame 48. A lower surface 48A of the frame 48 is formed with three openings. Each of the ejection modules 49A, 49B, and 49C is arranged with its lower surface being positioned in the corresponding opening. By virtue of this, the lower surface of the ejection module 49 is exposed to the lower side. The ejection module 49 is arranged in the conveyance path 43 in the left-right direction.

As depicted in FIG. 4, the ejection modules 49A and 49B are arranged at the same position in the conveyance orientation 8A. The ejection modules 49A and 49B are arranged at an interval in the conveyance orientation 8A. The ejection module 49C is arranged at the downstream side of the ejection modules 49A and 49B in the conveyance orientation 8A. The ejection module 49C is arranged between the two adjacent ejection modules 49A and 49B in the left-right direction. The ejection module 49C is arranged with its left end on the left side of the right end of the ejection module 49B. The ejection module 49C is arranged with its right end on the right side of the left end of the ejection module 49B. That is, in the left-right direction, the end of the election module 49C overlaps with the ends of the ejection modules 49A and 49B.

Each of the ejection modules 49A, 49B, and 49C includes a plurality of nozzles 38A. Each of the nozzles 38A is open in the lower surface 50 of the ejection module 49A, 49B, or 49C. Each of the lower surfaces 50 expands in the front-rear direction and in the left-right direction. As described above, from the plurality of nozzles 38A, the ink is ejected downward toward the sheet S supported on the conveyance belt 101 of the first support mechanism 51 to record an image on the sheet S. Note that the arrangement and number of the plurality of nozzles 38A are not limited to those depicted in FIGS. 1 and 4.

The head 38 moves along the up-down direction between a recording position depicted in FIG. 2, FIGS. 13 to 15, and FIG. 18, a capped position depicted in FIG. 16, a wiped position depicted in FIG. 17 with the solid line, and an upper withdrawal position depicted in FIG. 17 with the broken line. The recording position serves for the head 38 to record an image on the sheet S supported on the conveyance belt 101. The capped position serves for the head 38 to stay when the ejection module 49 is covered by the maintenance mechanism 60. The capped position is above the recording position (further away from the first support mechanism 51 than the recording position). The wiped position serves for the head 38 to stay when the sponge wiper 64 and the rubber wiper 63 of the maintenance mechanism 60 are wiping the lower surface 50 of the ejection module 49. The wiped position is above the capped position. The upper withdrawal position serves to completely cause the head 38 to keep away from the maintenance mechanism 60. The upper withdrawal position is above the wiped position.

As depicted in FIG. 2, head 38 is moved by a ball screw 29. The ball screw 29 includes a screw shaft 29A and a nut member 29B. The screw shaft 29A is supported by the lower casing 32 to be rotatable about a shaft along the up-down direction. The screw shaft 29A is rotated by a driving force transmitted from a head motor 54 (see FIG. 18). The nut member 29B screws together with the screw shaft 29A. The nut member 29B is fixed on the head 38. The nut member 29B moves upward on turning of the screw shaft 29A forward but moves downward on turning the screw shaft 29A backward. The head 38 moves vertically and integrally with the nut member 29B. Note that in order to prevent the head 38 from rotating due to a rotation of the ball screw 29, a pair of plates are arranged in the internal space 32A to nip the head 38. Further, the configuration for the head 38 to move vertically is not limited to that of using the ball screw 29 but may adopt various configurations publically known.

<The First Support Mechanism 51>

Figure 5:
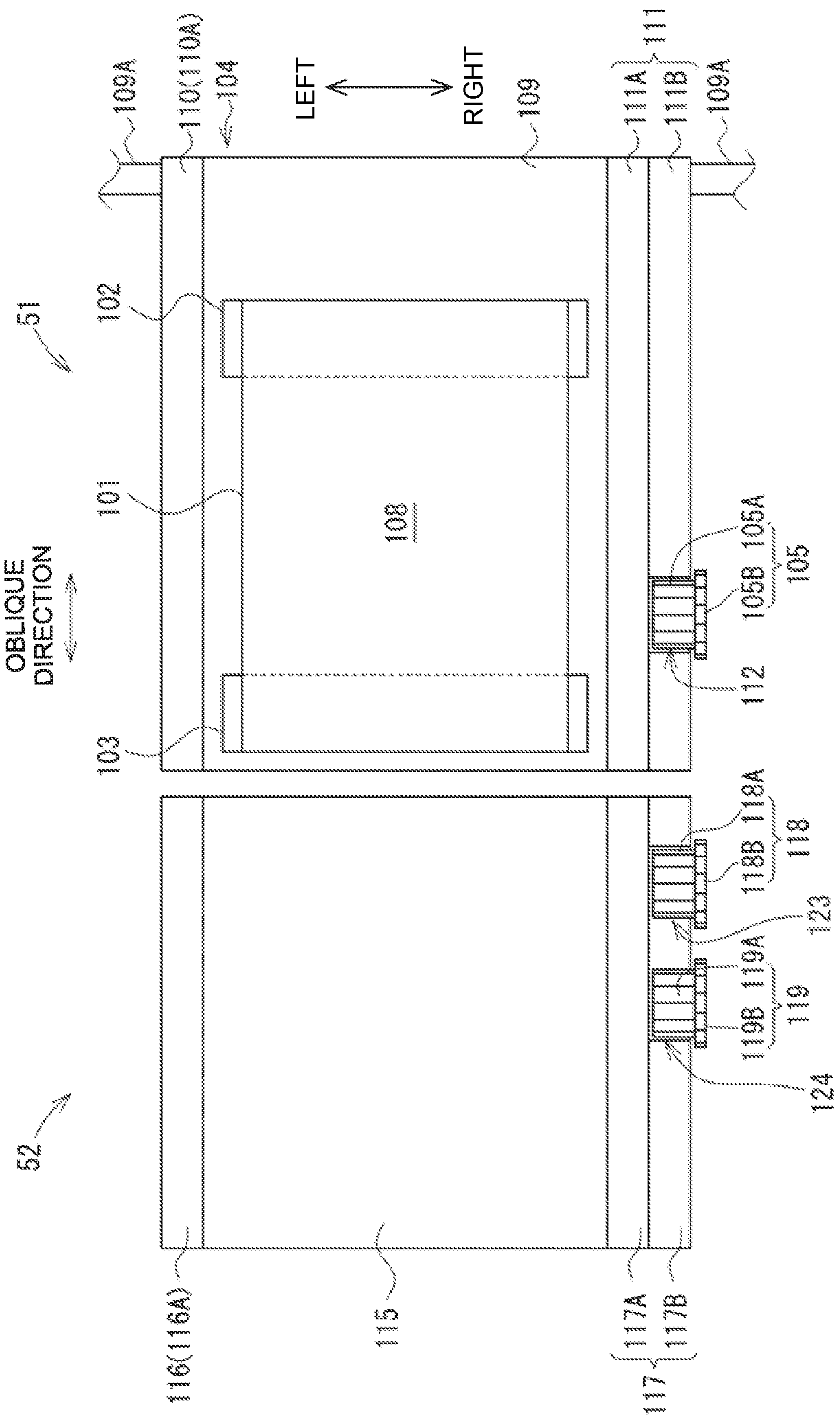
FIG. 5 is a plan view of the first support mechanism 51 in a second posture and a second support mechanism 52.
Figure 6:
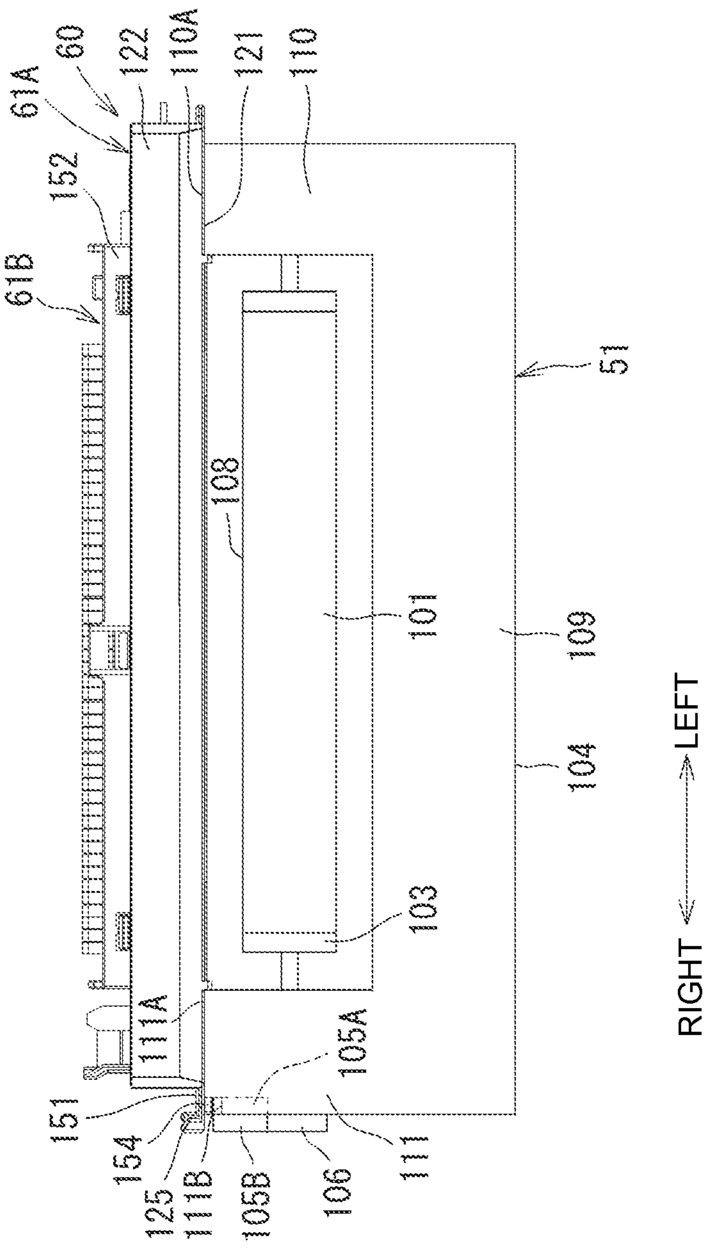
FIG. 6 is a front view of the first support mechanism 51 in the second posture and the maintenance mechanism 60.

As depicted in FIGS. 2, 5, and 6, the first support mechanism 51 includes the conveyance belt 101, a driving roller 102, a driven roller 103, a supporter 104, a gear 105, and a gear 106. Note that teeth of the gears 105 and 106 are omitted in each figure.

The driving roller 102 and the driven roller 103 are supported rotatably by the supporter 104. The driving roller 102 and the driven roller 103 are apart from each other in the front-rear direction (the conveyance orientation 8A). The conveyance belt 101 is an endless belt. The conveyance belt 101 is fitted around and on the driving roller 102 and the driven roller 103. The conveyance belt 101 is arranged in the conveyance path 43 in the left-right direction.

The driving roller 102 is rotated by a driving force rendered by a conveyance motor 53 (see FIG. 18) to turn the conveyance belt 101 into motion. Along with the motion of the conveyance belt 101, the driven roller 103 is rotated. The conveyance belt 101 has the conveyance surface 108. The conveyance surface 108 is an upper part of the outer circumference of the conveyance belt 101, extending along the conveyance orientation 8A. The conveyance surface 108 faces the nozzles 38A of the head 38 across the conveyance path 43. The driving roller 102 rotates to move the conveyance surface 108 in the conveyance orientation 8A. Further, the conveyance surface 108 supports the sheet S from below between the conveyance roller pairs 36 and 40 while rendering a force for conveying the sheet S. By virtue of this, the conveyance belt 101 conveys the sheet S positioned in the conveyance path 43 in the conveyance orientation 8A along the conveyance surface 108.

As depicted in FIGS. 2 and 5, the supporter 104 includes a shaft 109A. The shaft 109A is supported rotatably by the lower casing 32. The shaft 109A extends in the left-right direction (a direction orthogonal to the conveyance orientation 8A and parallel to the lower surface 50 of the ejection module 49). The shaft 109A is provided at the upstream side of the driving roller 102 in the conveyance orientation 8A. The shaft 109A is positioned below the conveyance roller pair 36.

The shaft 109A is rotated by a driving force transmitted from a shaft motor 59 (see FIG. 18). The supporter 104 is rotated about the shaft 109A with the shaft 109A in rotation. Due to the rotation of the supporter 104, the conveyance belt 101, the driving roller 102, the driven roller 103, the gear 105, and the gear 106 are also caused to rotate. That is, the first support mechanism 51 rotates. The leading end 51A of the first support mechanism 51 is positioned at the downstream side of the shaft 109A in the conveyance orientation 8A.

Note that the supporter 104 is not limited to the above configuration for rotating. For example, the supporter 104 may be configured to rotate about the shaft 109A by way of letting the lower casing 32 include the shaft 109A which is fitted into a hole provided in the supporter 104. In this case, the supporter 104 includes an imaginary axis.

The first support mechanism 51 is rotatable between a first posture (a first rotating position) depicted in FIG. 2 and FIGS. 16 to 18, and a second posture (a second rotating position) depicted in FIGS. 13 to 15. In other words, the supporter 104 is changeable in posture between the first posture (see FIG. 2) parallel to the lower surface 50 of the ejection module 49, and the second posture (see FIG. 15) being inclined from the first posture centered at the shaft 109A, where the leading end 51A is positioned below the shaft 109.

As depicted in FIG. 2, when the first support mechanism 51 is in the first posture, the conveyance surface 108 of the conveyance belt 101 extends along the front-rear direction. By virtue of this, the conveyance belt 101 can frontward convey the sheet S positioned in the conveyance path 43 to send the same between the heater 39 and the supporting member 46.

As depicted in FIGS. 13 to 15, when the first support mechanism 51 is in the second posture, the leading end 51A of the first support mechanism 51 is positioned lower than when the leading end 51A is positioned in the first posture (see FIG. 2). By virtue of this, the conveyance surface 108 of the conveyance belt 101 extends along an oblique direction, downward as extending frontward. Note that the oblique direction is an orientation intersecting the conveyance orientation 8A and orthogonal to the left-right direction.

As depicted in FIGS. 5 and 6, the supporter 104 includes a main body 109 and upright walls 110 and 111. Note that in the following explanation for the supporter 104, the first support mechanism 51 is supposed to be in the second posture. The main body 109 is approximately a plate-like member including the shaft 109A. The upright wall 110 is provided to stand upward from the left end of the main body 109. The upright wall 111 is provided to stand upward from the right end of the main body 109. The upright walls 110 and 111 extend along the oblique direction.

The upright walls 110 and 111 are arranged outside of the conveyance path 43 in the left-right direction. The upright walls 110 and 111 support the driving roller 102 and the driven roller 103 in a rotatable manner.

The upright wall 110 includes an upper surface 110A. The upright wall 111 includes a first upper surface 111A and a second upper surface 111B. The second upper surface 111B is in a different position from the first upper surface 111A in the left-right direction. The upper surface 110A and the first upper surface 111A support the maintenance mechanism 60 and guide the maintenance mechanism 60 in movement. The second upper surface 111B is in a position allowed to face a rack 154 of the maintenance mechanism 60. The second upper surface 111B is formed with an opening 112. From the opening 112, part of the gear 105A projects upward. The gear 105A can engage the rack 154 in the opposed position.

As depicted in FIG. 6, the gear 105 and the gear 106 are supported rotatably by the supporter 104 of the first support mechanism 51. The gear 105 is constructed from the gears 105A and 105B aligning along the left-right direction. The gear 105A and the gear 105B are arranged coaxially with each other. The gear 105A and the gear 105B rotate integrally. Note that the gear 105A may have some clearance against the gear 105B in the rotary direction. The gear 105B is engaged with the gear 106. The gear 106 is linked with a first motor 55 (see FIG. 18; an example of the motor) directly or via another gear or the like, to receive the driving force from the first motor 55.

<The Second Support Mechanism 52>

As depicted in FIG. 2, the second support mechanism 52 is arranged to extend as a whole in the oblique direction.

As depicted in FIGS. 2 and 5, the second support mechanism 52 includes a main body 115, upright walls 116 and 117, gears 118, 119, and 120. Note that in each figure, illustration is omitted for the teeth of the gears 118, 119, and 120.

The main body 115 is an almost plate-like member, fixed on the lower casing 32. The upright wall 116 is provided to stand upward from the left end of the main body 115. The upright wall 117 is provided to stand upward from the right end of the main body 115. The upright walls 116 and 117 extend along the oblique direction.

The upright wall 116 is at the same position as the upright wall 110 of the first support mechanism 51 in the left-right direction. The upright wall 117 is at the same position as the upright wall 111 of the first support mechanism 51 in the left-right direction.

The upright wall 116 includes an upper surface 116A. The upright wall 117 includes a first upper surface 117A and a second upper surface 117B. The second upper surface 117B is in a different position from the first upper surface 117A in the left-right direction.

When the first support mechanism 51 is in the second posture, the first upper surface 117A is positioned to align with the first upper surface 111A of the upright wall 111 of the first support mechanism 51 along the oblique direction, and on the same plane as the first upper surface 111A. That is, the first upper surface 117A and the first upper surface 111A align linearly. When the first support mechanism 51 is in the second posture, the second upper surface 117B is positioned to align with the second upper surface 111B of the upright wall 111 of the first support mechanism 51 along the oblique direction, and on the same plane as the second upper surface 111B. That is, the second upper surface 117B and the second upper surface 111B also align linearly.

The upper surface 116A and the first upper surface 117A support the maintenance mechanism 60 and guide the maintenance mechanism 60 in movement. The second upper surface 117B is in a position allowed to face the rack 154 of the maintenance mechanism 60. As depicted in FIG. 5, the second upper surface 117B is formed with openings 123 and 124. The opening 124 is positioned in front of the opening 123. From the opening 123, part of the gear 118 projects upward. From the opening 124, part of the gear 119 projects upward. The gears 118 and 119 can engage the rack 154 in the opposed position.

As depicted in FIGS. 2 and 5, the gears 118, 119, and 120 are supported rotatably by the main body 115 of the second support mechanism 52. The gear 118 is constructed from gears 118A and 118B aligning along the left-right direction. The gear 118A and the gear 118B are arranged coaxially with each other. The gear 118A and the gear 118B rotate integrally. Note that the gear 118A may have some clearance against the gear 118B in the rotary direction. The gear 119 is constructed from gears 119A and 119B aligning along the left-right direction. The gear 119A and the gear 119B are arranged coaxially with each other. The gear 119A and the gear 119B rotate integrally. Note that the gear 119A may have some clearance against the gear 119B in the rotary direction. The gear 120 is engaged with the gears 118A and 119B. By virtue of this, when the gear 120 rotates, the gears 118 and 119 rotate in the same direction. The gear 120 is linked with a second motor 56 directly or via another gear or the like, to receive the driving force from the second motor 56.

<The Maintenance Mechanism 60>

Figure 7:
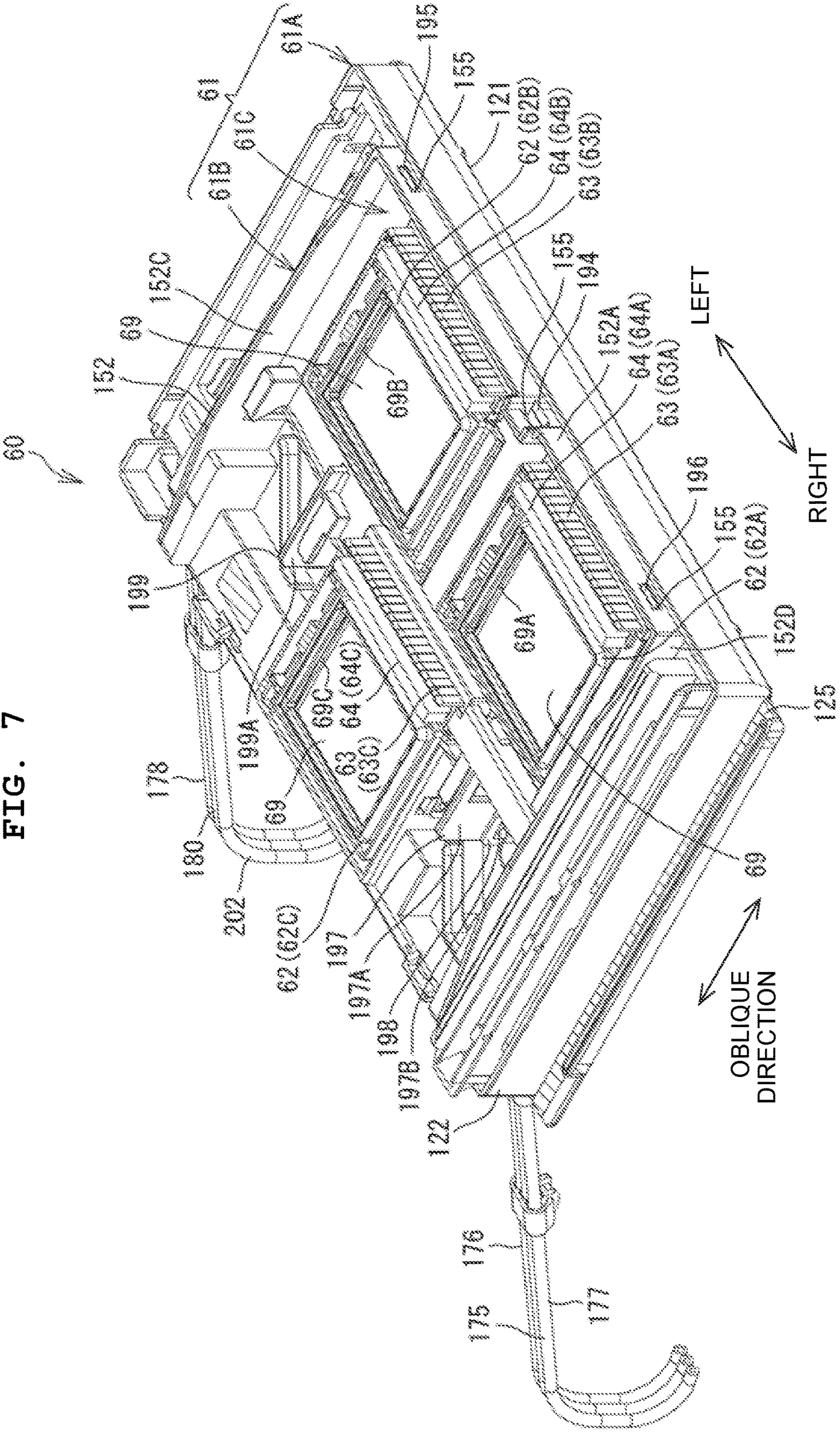
FIG. 7 is a perspective view of the maintenance mechanism 60.

As depicted in FIGS. 6 and 7, the maintenance mechanism 60 includes a support 61 (a supporting stand), the sponge wiper 64, the rubber wiper 63, and the cap 62. Note that in the following explanation of the maintenance mechanism 60, the maintenance mechanism 60 is supported by the first support mechanism 51 in the second posture and the second support mechanism 52.

<The Support 61>

The support 61 has a base 61A, a main body 61B mounted on the base 61A, and a wiper holder 61C holding the sponge wiper 64 and the rubber wiper 63 on the main body 61B. The base 61A has a box-like shape with its top being open. The base 61A includes a first base plate 121, a first edge plate 122 provided to stand upward from the edge of the first base plate 121, an extension piece 125, and the rack 154.

The first base plate 121 is plate-like in shape, expanding in the oblique direction and in the left-right direction. The upper surface and the lower surface of the first base plate 121 are formed into a rectangular shape longer in the left-right direction than in the oblique direction. The lower surface of the first base plate 121 is contactable with the upper surface 110A of the upright wall 110 of the first support mechanism 51 from above. By virtue of this, the maintenance mechanism 60 is supportable on the first support mechanism 51. The lower surface of the first base plate 121 is contactable with the upper surface 116A of the upright wall 116 of the second support mechanism 52 from above. The lower surface of the first base plate 121 is contactable with the first upper surface 117A of the upright wall 117 of the second support mechanism 52 from above. By virtue of this, the maintenance mechanism 60 is supportable on the second support mechanism 52.

The first edge plate 122 is shaped into a rectangular frame in a planar view. The extension piece 125 extends rightward from the lower end of the right wall of the first edge plate 122. The extension piece 125 extends from one end to the other end of the right wall of the first edge plate 122 in the oblique direction.

Figure 8:
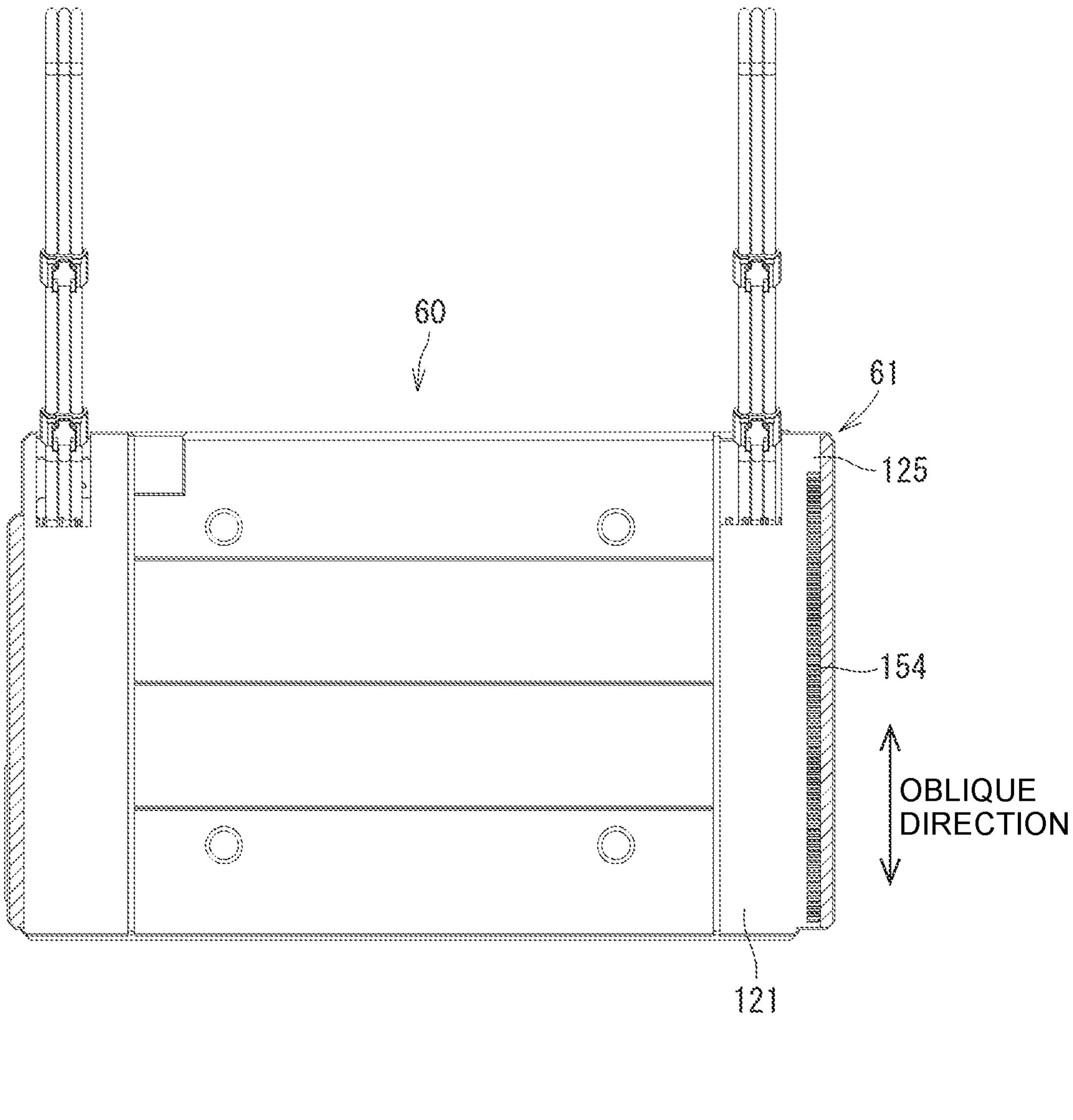
FIG. 8 is a bottom view of the maintenance mechanism 60.

The rack 154 is formed on the lower surface of the extension piece 125. As depicted in FIG. 8, the rack 154 extends from one end to nearly the other end of the extension piece 125 in the oblique direction. The rack 154 can vertically face the second upper surface 111B of the upright wall 111 of the first support mechanism 51 (see FIG. 6).

The rack 154 can engage the gear 105A projecting from the opening 112 of the second upper surface 111B. On rotating the gear 105A with the rack 154 engaged with the gear 105A, the maintenance mechanism 60 slides on the first support mechanism 51 along the upper surface 110A and the first upper surface 111A. That is, the maintenance mechanism 60 in movement is guided by the upper surface 110A and the first upper surface 111A of the first support mechanism 51.

The rack 154 can come to vertically face the second upper surface 117B of the upright wall 117 of the second support mechanism 52. The rack 154 can engage the gear 118A projecting from the opening 123 of the second upper surface 117B, and the gear 119A projecting from the opening 124 of the second upper surface 117B. On rotating the gear 105A with the rack 154 engaged with at least one of the gear 118A and the gear 119A, the maintenance mechanism 60 slides on the second support mechanism 52 along the upper surface 116A and the first upper surface 117A. That is, the maintenance mechanism 60 in movement is guided by the upper surface 116A and the first upper surface 117A of the second support mechanism 52.

By virtue of this, the maintenance mechanism 60 is movable, as will be described later on, between a standby position depicted in FIGS. 2 and 13, a maintenance position depicted in FIG. 16, and a wiping position depicted in FIG. 17. The maintenance mechanism 60 in the maintenance position or in the wiping position faces the lower surface 50 of the ejection module 49 of the head 38 in the up-down direction.

Figure 9:
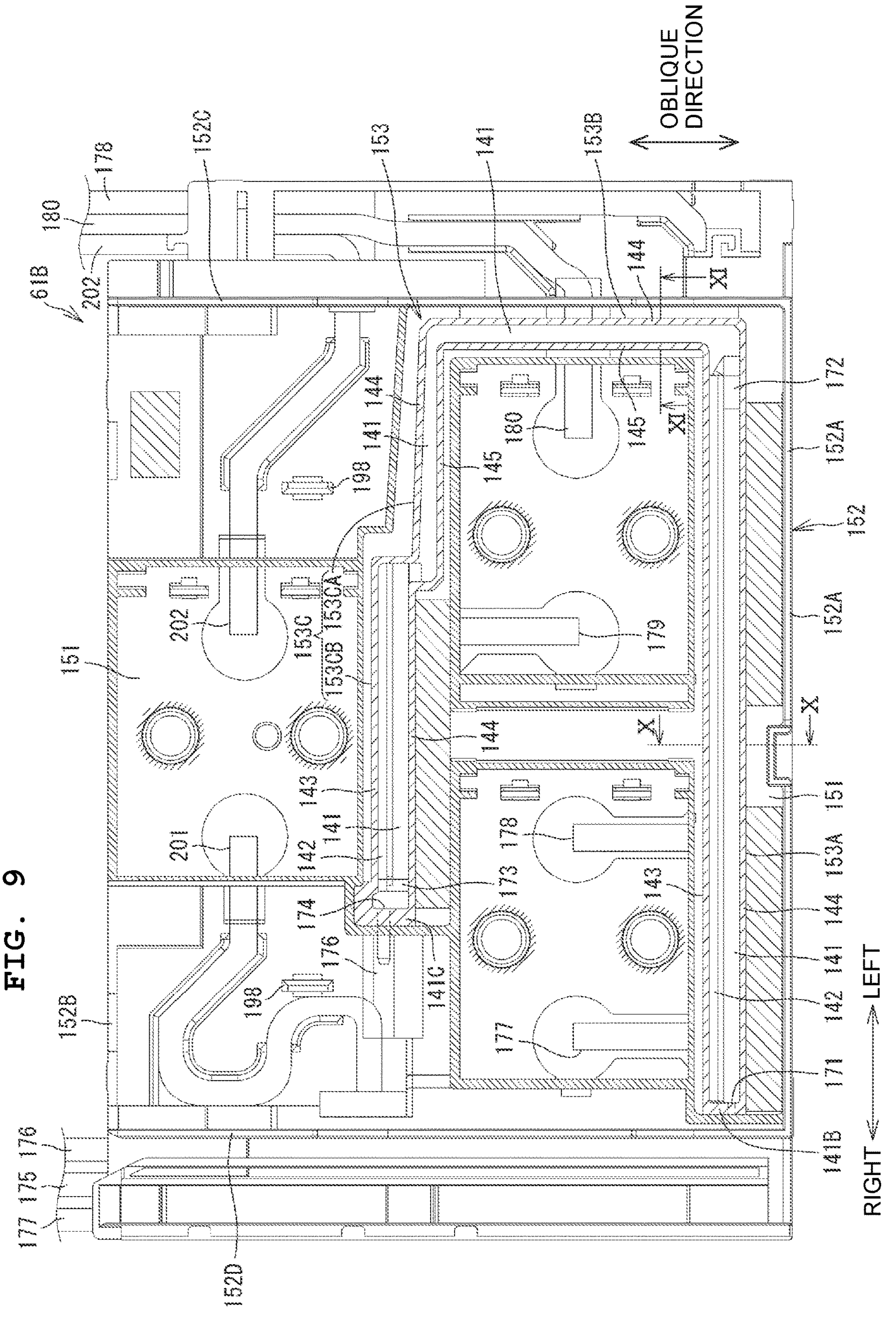
FIG. 9 is a cross section view of a flow channel 132 of a main body 61B cut along a plane parallel to a flow direction of the flow channel 132.

As depicted in FIGS. 7 and 9, the main body 61B is approximately box-like in shape and open at the top. The main body 61B is smaller than the base 61A. The main body 61B is fixed on the base 61A when mounted on the first base plate 121 of the base 61A. The main body 61B includes a second base plate 151, a second edge plate 152 provided to stand upward from the second base plate 151, and a liquid flow channel 153 allowing for the flowing of a liquid cleaner L retained in the liquid cleaner tank 76.

The second base plate 151 is plate-like and expends in the oblique direction and in the left-right direction. The upper surface and the lower surface of the second base plate 151 are formed into a shape of rectangle longer in the left-right direction than in the oblique direction. The second edge plate 152 is a rectangular frame in shape in a planar view. The second edge plate 152 has a first wall 152A, a second wall 152B, a third wall 152C, and a fourth wall 152D.

The first wall 152A extends in the left-right direction along the edge of the second base plate 151 at one side in the oblique direction (hereinafter, referred to as a rearward-and-upward orientation). Being supported by the first support mechanism 51 with the support 61 in the second posture, the first wall 152A is positioned above the second wall 152B. The left end of the first wall 152A is positioned at an interval rightward from the left edge of the second base plate 151.

The right end of the first wall 152A is positioned at an interval leftward from the right edge of the second base plate 151. The first wall 152A is formed with three through holes 155 penetrating therethrough in the oblique direction. The three through holes 155 are formed equidistantly in the left-right direction. The three through holes 155 can lock a first locker 194, a second locker 195 and a third locker 196 of a wiper holder 61C, which will be described later on.

The second wall 152B extends in the left-right direction along the edge of the second base plate 151 at the other side in the oblique direction (hereinafter, referred to as a frontward-and-downward orientation). Being supported by the first support mechanism 51 with the support 61 in the second posture, the second wall 152B is positioned below the first wall 152A. The left end of the second wall 152B is positioned at an interval rightward from the left edge of the second base plate 151. The right end of the second wall 152B is positioned at an interval leftward from the right edge of the second base plate 151. The third wall 152C links the left end of the first wall 152A and the left end of the second wall 152B. The fourth wall 152D links the right end of the first wall 152A and the right end of the second wall 152B.

One end 156 of the liquid flow channel 153 is open at a position lower than the level of the liquid cleaner L retained in the liquid cleaner tank 76. The other end 157 of the liquid flow channel 153 is open at a position higher than the level of the liquid cleaner L retained in the liquid cleaner tank 76.

As depicted in FIG. 9, the flow channel 153 is formed in the upper surface of the second base plate 151. The flow channel 153 is a groove concave downward from the upper surface of the second base plate 151, being open at the top. The liquid flow channel 153 is open upward with the supporter 104 being in the first posture, but open obliquely to the up-down direction with the supporter 104 being in the second posture. The flow channel 153 has a continuous U-shape having a U-turn, extending in the left-right direction (an example of the one direction) in a planar view. The liquid flow channel 153 extends to connect the sponge wiper 64A, the sponge wiper 64B, and the sponge wiper 64C arranged on the groove along a straight line. In particular, the flow channel 153 has a first flow channel 153A, an intermediate flow channel 153B, and a second flow channel portion 153C.

The first flow channel 153A is positioned at the upstream side of the liquid flow channel 153 in the flowing orientation of the liquid cleaner L. The first flow channel 153A is the part extending in the left-right direction in a front part of the main body 61B. A first oblique surface 172 is formed at the downstream end of the first flow channel 153A to incline such that the ditch may become shallower in depth as toward the downstream.

The intermediate flow channel 153B is positioned at the downstream side of the first flow channel 153A in the flowing orientation of the liquid cleaner L. The intermediate flow channel 153B is arranged in a left part of the main body 61B. In more particular, the intermediate flow channel 153B extends in the oblique forward orientation 5 from the downstream end of the first flow channel 153A to the intermediate part of the main body 61B in the oblique direction. The intermediate flow channel 153B is shallower than the first flow channel 153A.

The second flow channel 153C is positioned at the downstream side of the liquid flow channel 153 in the flowing orientation of the liquid cleaner L. The second flow channel 153C has an upstream portion 153CA extending rightward from the downstream end of the intermediate flow channel 153B, a connecting portion 153CB extending from the downstream end of the upstream portion 153CA in the frontward-and-downward orientation, and a downstream portion 153CC extending rightward from the downstream end of the connecting portion 153CB. The upstream portion 153CA, the connecting portion 153CB, and the downstream portion 153CC are positioned below the first flow channel 153A in the up-down direction with the supporting stand 61 being in the second posture. The connecting portion 153CB is formed with a second oblique surface 172A inclining such that the ditch may become deeper as toward the downstream.

Figure 10A:
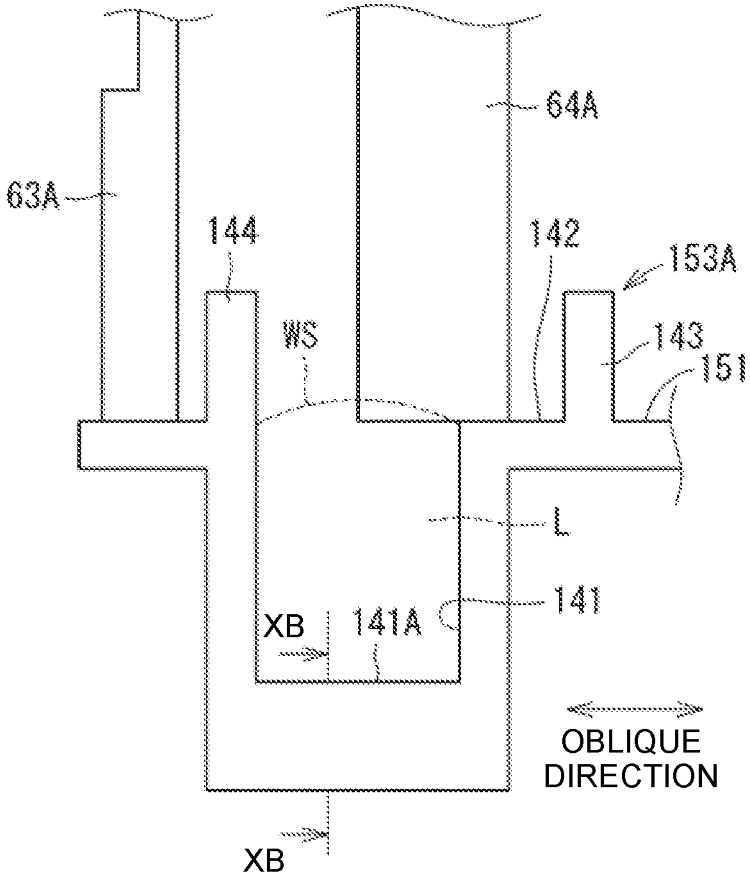
FIG. 10A is a cross section view along the line X-X of FIG. 9.

As depicted in FIG. 10A, the first flow channel 153A has a recess 141, a support surface 142 (an example of the first end surface), a first barrier wall 143 (an example of the first barrier wall), and a second barrier wall 144. The recess 141 is a portion recessing downward from the upper surface of the second base plate 151. The recess 141 is formed into an upward U-shape in the cross section cut up along a plane orthogonal to the flow direction of the flow channel 153. The base surface 141A of the recess 141 is an example of the second end surface. The recess 141 extends leftward up to nearly the rear end of the third wall 152C from the upstream end 141B arranged in the vicinity of the rear end of the fourth wall 152D. The depth of the recess 141 is set for a water level WS of the liquid cleaner L flowing through the recess 141 to be lower than the upper end of the first barrier wall 143 but higher than the support surface 142 when a return pump 75 is driven. Further, the length of the recess 141 in the width direction is longer than the inner diameter of an inflow port 171. By virtue of this, the flow of the liquid cleaner L in the recess 141 cannot be interfered.

The support surface 142 is positioned at the upper end of the recess 141. The support surface 142 is formed by part of the upper surface of the second base plate 151. The support surface 142 is flat, expanding in the oblique direction and in the left-right direction from the upper end of the recess 141. In this embodiment, the support surface 142 expands in the frontward-and-downward orientation and in the left-right direction from the upper end of the recess 141 at the side of the frontward-and-downward orientation. The support surface 142 extends from the upper end 141B up to nearly the lower end of the recess 141. Note that the support surface 142 may expand in the rearward-and-upward orientation and in the left-right direction from the upper end of the recess 141 at the side of the rearward-and-upward orientation.

The first barrier wall 143 extends upward from the edge of the support surface 142 on the opposite side to the base surface 141A in the oblique direction. The first barrier wall 143 extends from the upper end of the support surface 142 to the left side of the downstream end of the support surface 142 (the downstream end of the recess 141 of the first flow channel 153A). The second barrier wall 144 extends upward from the upper end of the recess 141 on the opposite side to the first barrier wall 143 in the oblique direction. The second barrier wall 144 is as high as the first barrier wall 143. The inner wall surface of the second barrier wall 144 is on the same plane at the inner wall surface of the recess 141.

Figure 10B:
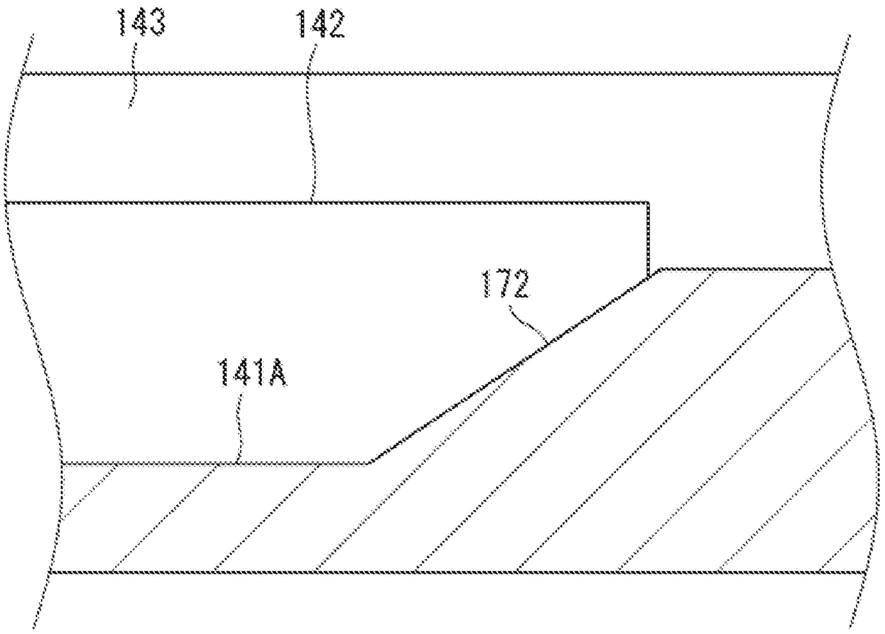
FIG. 10B is a cross section view along the line XB-XB of FIG. 10A.

As depicted in FIGS. 9 and 10B, in the vicinity of the downstream end of the recess 141 of the first flow channel 153A (the downstream side of the place of the sponge wiper 64B arranged in the flowing orientation of the liquid cleaner L), the first oblique surface 172 is formed to increase in the height from the base surface 141A of the recess 141 as toward the downstream side of the liquid cleaner L in the flowing orientation. The first oblique surface 172 is flat and inclined upward in the left-right direction. The liquid cleaner L flowing through the recess 141 flows into the intermediate flow channel 153B after passing over the first oblique surface 172. Note that in FIG. 10B, the sponge wiper 64 is omitted in illustration.

Figure 11:
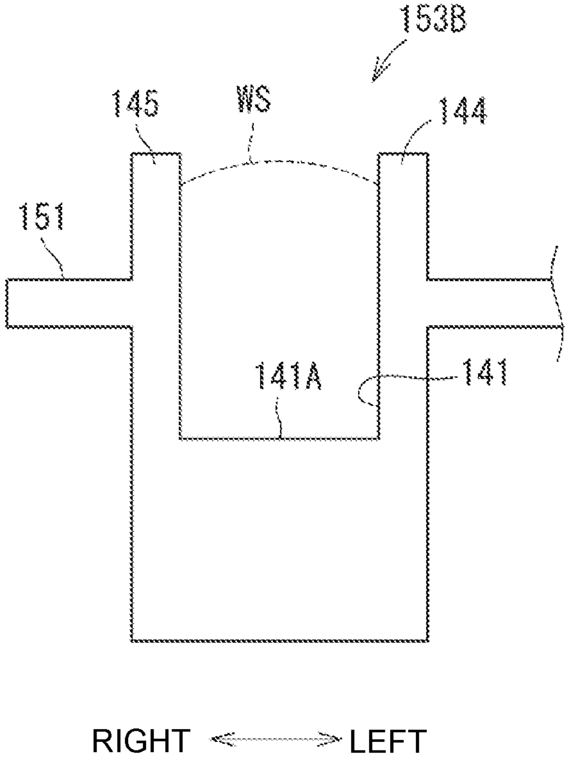
FIG. 11 is a cross section view along the line XI-XI of FIG. 9.

As depicted in FIGS. 9 and 11, the intermediate flow channel 153B differs from the first flow channel 153A in that the support surface 142 is absent and the recess 141 is shallower than the recess 141 of the first flow channel 153A. The intermediate flow channel 153B has the recess 141, the second barrier wall 144, and the third barrier wall 145. Note that in the intermediate flow channel 153B, the same signs as the first flow channel 153A are assigned to the elements corresponding to the first flow channel 153A.

The recess 141 of the intermediate flow channel 153B extends in the frontward-and-downward orientation from the downstream end of the recess 141 of the first flow channel 153A to the middle part of the second base plate 151 in the frontward-and-downward orientation. The upstream end of the recess 141 of the intermediate flow channel 153B is linked to the downstream end of the recess 141 of the first flow channel 153A. The upstream end of the second barrier wall 144 of the intermediate flow channel 153B is linked to the downstream end of the second barrier wall 144 of the first flow channel 153A. The downstream end of the second barrier wall 144 of the intermediate flow channel 153B extends to the downstream end of the recess 141 of the intermediate flow channel 153B. The third barrier wall 145 of the intermediate flow channel 153B is positioned at the upper end of the recess 141 on the right. The inner wall surface of the third barrier wall 145 of the intermediate flow channel 153B is on the same plane as the inner wall surface of the recess 141 of the intermediate flow channel 153B. The upstream end of the third barrier wall 145 of the intermediate flow channel 153B is linked to the downstream end of the first barrier wall 143 of the first flow channel 153A. The downstream end of the third barrier wall 145 of the intermediate flow channel 153B extends to the downstream end of the recess 141 of the intermediate flow channel 153B.

The second flow channel 153C has a downstream portion 153CB having the support surface 142 and an upstream portion 153CA not having the support surface 142. The upstream portion 153CA of the second flow channel 153C has the same configuration as the intermediate flow channel 153B. That is, the upstream portion 153CA of the second flow channel 153C has a recess 141, a second barrier wall 144, and a third barrier wall 145. Note that in the upstream portion 153CA of the second flow channel 153C, the same signs as the intermediate flow channel 153B are assigned to the elements corresponding to the intermediate flow channel 153B.

The recess 141 of the upstream portion 153CA extends rightward from the downstream end of the recess 141 of the intermediate flow channel 153B to a position on the left of the middle of the second base plate 151 in the left-right direction. The upstream end of the recess 141 of the upstream portion 153CA is linked to the downstream end of the recess 141 of the intermediate flow channel 153B. The downstream end of the recess 141 of the upstream portion 153CA is open in the frontward-and-downward orientation. The upstream end of the second barrier wall 144 of the upstream portion 153CA is linked to the downstream end of the second barrier wall 144 of the intermediate flow channel 153B. The downstream end of the second barrier wall 144 of the upstream portion 153CA extends to the downstream end of the recess 141 of the upstream portion 153CA. The upstream end of the third barrier wall 145 of the upstream portion 153CA is linked to the downstream end of the third barrier wall 145 of the intermediate flow channel 153B. The downstream end of the third barrier wall 145 of the upstream portion 153CA extends to the downstream end of the recess 141 of the upstream portion 153CA.

The downstream portion 153CB of the second flow channel 153C has the same configuration as the first flow channel 153A except the fact that the recess 141 is shallower than the recess 141 of the first flow channel 153A. That is, the downstream portion 153CB of the second flow channel 153C has a recess 141, a support surface 142, a first barrier wall 143, and a second barrier wall 144. Note that in the downstream portion 153CB of the second flow channel 153C, the same signs as the first flow channel 153A are assigned to the elements corresponding to the first flow channel 153A.

The recess 141 of the downstream portion 153CB extends rightward from the downstream end of the recess 141 of the upstream portion 153CA to a position on the right of the middle of the second base plate 151 in the left-right direction. The upstream end of the recess 141 of the downstream portion 153B is open in the rearward-and-upward orientation and is linked to the downstream end of the recess 141 of the upstream portion 153CA. The support surface 142 of the downstream portion 153CB extends from the upstream end up to nearly the downstream end of the recess 141 of the downstream portion 153CB. The upstream end of the first barrier wall 143 of the downstream portion 153CB is linked to the downstream end of the second barrier wall 144 of the upstream portion 153CA. The downstream end of the first barrier wall 143 of the downstream portion 153CB extends to the downstream end of the recess 141 of the downstream portion 153CB. The upstream end of the second barrier wall 144 of the downstream portion 153CB is linked to the downstream end of the third barrier wall 145 of the upstream portion 153CA. The downstream end of the second barrier wall 144 of the downstream portion 153CB extends to the downstream end of the recess 141 of the downstream portion 153CB.

In the vicinity of the downstream end of the recess 141 of the downstream portion 153CB, a second oblique surface 173 is formed to decrease in the height from the base surface 141A as toward the downstream side of the liquid cleaner L in the flowing orientation. The second oblique surface 173 is flat and inclined downward in the left-right direction.

As depicted in FIG. 9, in the inner wall of the first flow channel 153A at the upper end 141B of the recess 141, the inflow port 171 is open for the liquid cleaner L to flow into the recess 141 of the first flow channel 153A. The inflow port 171 is connected to one end of a first supply tube 175. The other end of the first supply tube 175 is connected to the liquid cleaner tank 76, reaching to the outside of the maintenance mechanism 60. The other end of the first supply tube 175 is open at a position lower than the level of the liquid cleaner L retained in the liquid cleaner tank 76 (see FIG. 2).

In the inner wall of the second flow channel 153C at the downstream end 141C, an outflow port 174 is open for the liquid cleaner L to flow out of the recess 141 of the downstream portion 153CB. The inflow port 171 is connected to one end of a return tube 176. The outflow port 174 is open at a position higher than the level of the liquid cleaner L retained in the liquid cleaner tank 76 (see FIG. 2). The other end of the return tube 176 is connected to the liquid cleaner tank 76, reaching to the outside of the maintenance mechanism 60. The return tube 176 is provided with a return pump 75 (an example of the first pump; see FIG. 2). The controller 130 controls the driving of the return pump 75.

Figure 12:
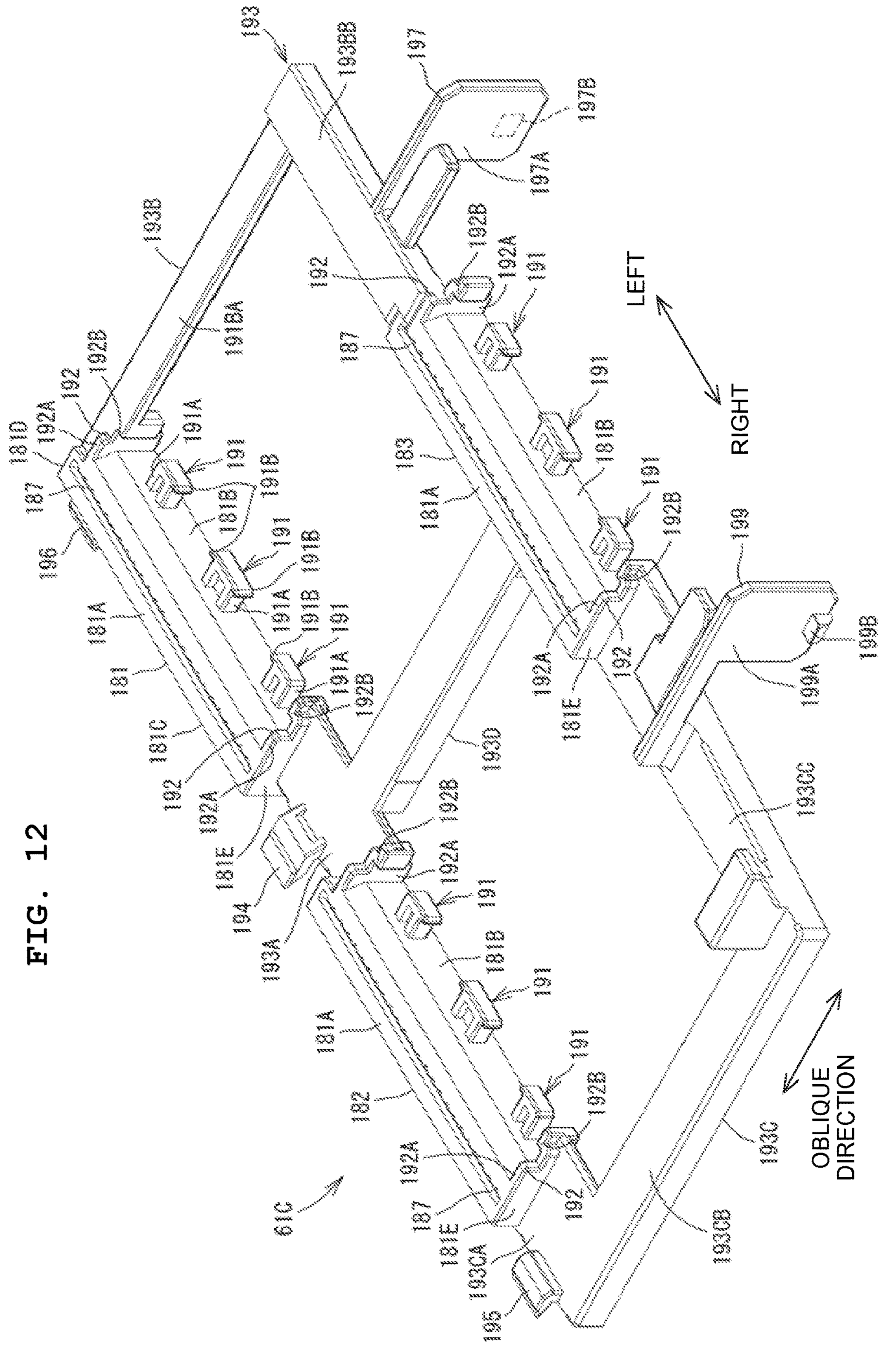
FIG. 12 is a perspective view of a wiper holder 61C.

As depicted in FIG. 12, the wiper holder 61C holds three sponge wipers 64A, 64B, and 64C, and three rubber wipers 63A, 63B, and 63C, respectively, with a first holder 181, a second holder 182, and a third holder 183. The first holder 181 and the second holder 182 are positioned at an interval in the left-right direction. The third holder 183 is positioned in front of the first holder 181 and the second holder 182 at an interval in the frontward-and-downward orientation. The third holder 183 is positioned in the middle between the first holder 181 and the second holder 182 in the left-right direction. The first holder 181, the second holder 182, and the third holder 183 have the same shape. Therefore, hereinbelow, only the first holder 181 will be explained among the first holder 181, the second holder 182, and the third holder 183. Note that the same signs as the first holder 181 are assigned to the elements corresponding to the second holder 182 and the third holder 183, and the explanation therefor will be omitted.

The first holder 181 is box-like and open at the lower side. The first holder 181 is a little longer in the left-right direction than the rubber wiper 63 in the left-right direction. The first holder 181 has an upper wall 181A, a front wall 181B, a rear wall 181C, a left wall 181D, and a right wall 181E.

The upper wall 181A is plate-like, expanding along the left-right direction and the oblique direction. The upper wall 181A is formed with a slit 187 penetrating vertically. The slit 187 extends along the left-right direction. The slit 187 is sized to allow for inserting the rubber wiper 63. The slit 187 is sized to be almost the same as the rubber wiper 63 in the left-right direction. The slit 187 is sized to be almost the same as the rubber wiper 63 in the oblique direction.

The front wall 181B extends downward from the edge of the upper wall 181A in the frontward-and-downward orientation. The front wall 181B is plate-like, expanding in the left-right direction and the up-down direction. A projection 191 is formed on the front surface of the front wall 181B to project in the frontward-and-downward orientation. The projection 191 has an insertion portion 191A to extend in the frontward-and-downward orientation to be inserted into an aftermentioned insertion ditch of the sponge wiper 64, and a projection piece 191B projecting outward beyond the insertion portion 191A in the left-right direction from the extending end of the insertion portion 191A. In this embodiment, three such projections 191 are provided at equal intervals in the left-right direction.

A pair of regulation portions 192 are provided to face each other in the left-right direction on the two ends of the front surface of the front wall 181B in the left-right direction. Each regulation portion 192 has a shape of flexing the ends of the plate expanding in the oblique direction and the up-down direction. In particular, each regulation portion 192 has contact portions 192A extending in the frontward-and-downward orientation, and regulation pieces 192B extending inward in the left-right direction from the extending end of the contact portions 192A. The two contact portions 192A have almost the same interval in the left-right direction as the length of the sponge wiper 64 in the left-right direction. The two regulation pieces 192B have an interval in the left-right direction a little shorter than the length of the sponge wiper 64 in the left-right direction.

The rear wall 181C extends downward from the edge of the upper wall 181A at the side of the rearward-and-upward orientation. The rear wall 181C is plate-like, expanding in the left-right direction and the up-down direction. The left wall 181D links the left edge of the upper wall 181A, the left edge of the front wall 181B, and the left edge of the rear wall 181C. The left wall 181D is plate-like, expanding in the oblique direction and the up-down direction. The right wall 181E links the right edge of the upper wall 181A, the right edge of the front wall 181B, and the right edge of the rear wall 181C. The right wall 181E is plate-like, expanding in the oblique direction and the up-down direction.

The first holder 181, the second holder 182, and the third holder 183 are connected with each other by a plurality of linking pieces 193. By virtue of this, the wiper holder 61C is formed as a whole into an approximately rectangular frame. The plurality of linking pieces 193 each has a first linking piece 193A, a second linking piece 193B, a third linking piece 193C, and a fourth linking piece 193D.

The first linking piece 193A is formed linearly to connect the first holder 181 and the second holder 182.

The second linking piece 193B is formed into an L-shape to connect the first holder 181 and the third holder 183. The second linking piece 193B has a first extension portion 193BA extending in the frontward-and-downward orientation from the left end of the front wall 181B of the first holder 181, and a second extension portion 193BB extending rightward from the end of the first extension portion 193BA at the side of the frontward-and-downward orientation to the left wall 181D of the third holder 183.

The third linking piece 193C is formed into an approximate U-shape to connect the second holder 182 and the third holder 183. The third linking piece 193C has a third extension portion 193CA extending rightward from the right wall 181E of the second holder 182, a fourth extension portion 193CB extending in the frontward-and-downward orientation from the right end of the third extension portion 193CA, and a fifth extension portion 193CC extending leftward from the end of the fourth extension portion 193CB at the side of the frontward-and-downward orientation to the right wall 181E of the third holder 183.

The fourth linking piece 193D is formed linearly to connect the third holder 183 and the first linking piece 193A. The first linking piece 193A, the second linking piece 193B, the third linking piece 193C and the fourth linking piece 193D are plate-like, expanding in the oblique direction and the left-right direction.

The first locker 194 is formed on the upper surface of the first linking piece 193A to extend in the rearward-and-upward orientation beyond the edge of the first linking piece 193A at the side of the rearward-and-upward orientation. Being inserted in the through hole 155 of the first wall 152A of the main body 61B, the first locker 194 is locked in the through hole 155 (see FIG. 7). The second locker 195 is formed on the upper surface of the third extension portion 193CA of the third linking piece 193C to extend in the rearward-and-upward orientation beyond the edge of the third extension portion 193CA at the side of the rearward-and-upward orientation. Being inserted in the through hole 155 of the first wall 152A of the main body 61B, the second locker 195 is locked in the through hole 155 (see FIG. 7). The third locker 196 is formed on the rear wall 181C of the first holder 181 to extend in the rearward-and-upward orientation. Being inserted in the through hole 155 of the first wall 152A of the main body 61B, the third locker 196 is locked in the through hole 155 (see FIG. 7).

A first engaging piece 197 is formed on the second extension portion 193BB of the second linking piece 193B to extend in the frontward-and-downward orientation beyond the edge of the second extension portion 193BB at the side of the frontward-and-downward orientation. The first engaging piece 197 has a first extension piece 197A and a first projection 197B. The first extension piece 197A is formed into an L-shape extending in the frontward-and-downward orientation and flexing downward. The first extension piece 197A is flat and plate-like, expanding in the oblique direction and the up-down direction. The first projection 197B is formed on the left surface of the first extension piece 197A. The first projection 197B is positioned at the lower end of the left surface of the first extension piece 197A. Being inserted in an engaging hole 198 of an inverse U-shape formed on the upper surface of the second base plate 151 of the main body 61B, the first projection 197B is locked (see FIGS. 7 and 9).

A second engaging piece 199 is formed on the fifth extension portion 193CC of the third linking piece 193C to extend in the frontward-and-downward orientation beyond the edge of the fifth extension portion 193CC at the side of the frontward-and-downward orientation. The second engaging piece 199 has a second extension piece 199A and a second projection 199B. The second extension piece 199A is formed into an L-shape extending in the frontward-and-downward orientation and flexing downward. The second extension piece 199A is flat and plate-like, expanding in the oblique direction and the up-down direction. The second projection 199B is formed on the right surface of the second extension piece 199A. The second projection 199B is positioned at the lower end of the right surface of the second extension piece 199A. Being inserted in the engaging hole 198 of the inverse U-shape formed on the upper surface of the second base plate 151 of the main body 61B, the second projection 199B is locked. By virtue of this, the wiper holder 61C is fitted on the main body 61B.

<The Sponge Wiper 64>

A sponge wiper 64 is formed of a sponge being a porous body absorbing and holding liquids. In this embodiment, three sponge wipers 64 (64A, 64B, and 64C) are provided. Note that the number of sponge wipers 64 is not limited to three but is set according to the number of ejection modules 49 of the head 38 described earlier on. Hereinbelow, the three sponge wipers 64A, 64B, and 64C will also be referred to as the sponge wiper 64, collectively. The sponge wiper 64 is formed into a long cuboid longer in the left-right direction than in the oblique direction and in the up-down direction (see FIG. 7). The sponge wiper 64 is longer in the up-down direction than in the oblique direction. On the lower surface of the sponge wiper 64, an insertion ditch (not shown) is formed to be upward concave. The insertion ditch extends from one end to the other end of the lower surface of the sponge wiper 64 in the oblique direction. The two ends of the insertion ditch are open in the oblique direction. In this embodiment, three insertion ditches are formed at equal intervals in the left-right direction.

The sponge wiper 64A corresponds to the ejection module 49A, and can face the ejection module 49A in the up-down direction. As depicted in FIGS. 7, 9 and 10A, the sponge wiper 64A is arranged at the right side of the center of the first flow channel 153A in the left-right direction. Extending out from the support surface 142 toward the recess 141, the lower surface of the sponge wiper 64A is supported by the support surface 142. By virtue of this, it becomes easier for the liquid cleaner L flowing through the recess 141 to contact with the lower surface of the sponge wiper 64A.

The sponge wiper 64A is installed in the first holder 181 of the wiper holder 61C. In particular, the three insertion ditches of the sponge wiper 64A are inserted in by the three projections 191 (see FIG. 12) of the first holder 181 in the frontward-and-downward orientation. In this state, the front surface of the sponge wiper 64A is in contact with the three regulation pieces 191B and the regulation pieces 192B of the two regulation portions 192. By virtue of this, the sponge wiper 64A is prevented from deviation in position in the oblique direction. The left surface and the right surface of the sponge wiper 64A are in contact with contact portions 192A of the two regulation portions 192. By virtue of this, the sponge wiper 64A is prevented from deviation in position in the left-right direction. As a result, the sponge wiper 64A is held on the support surface 142 of the first flow channel 153A.

The sponge wiper 64B corresponds to the ejection module 49B, and can face the ejection module 49B in the up-down direction. The sponge wiper 64B is arranged at the left side of the sponge wiper 64A at an interval. The sponge wiper 64B is positioned at the left side of the center of the first flow channel 153A in the left-right direction. Extending out from the support surface 142 toward the recess 141, the lower surface of the sponge wiper 64B is supported by the support surface 142. By virtue of this, it becomes easier for the liquid cleaner L flowing through the flow channel 153 to contact with the lower surface of the sponge wiper 64B. In the same manner as the sponge wiper 64A, the sponge wiper 64B is installed in the second holder 182 of the wiper holder 61C. By virtue of this, the sponge wiper 64B is held on the support surface 142 of the first flow channel 153A.

The sponge wiper 64C corresponds to the ejection module 49C, and can face the ejection module 49C in the up-down direction. As depicted in FIGS. 7 and 9, the sponge wiper 64C is arranged on the downstream portion 153CB of the second flow channel 153C. Extending out from the support surface 142 toward the recess 141, the lower surface of the sponge wiper 64C is supported by the support surface 142. By virtue of this, it becomes easier for the liquid cleaner L flowing through the recess 141 to contact with the lower surface of the sponge wiper 64C. In the same manner as the sponge wiper 64A, the sponge wiper 64C is installed in the third holder 183 of the wiper holder 61C. By virtue of this, the sponge wiper 64C is held on the support surface 142 of the downstream portion 153CB of the second flow channel 153C.

<The Rubber Wiper 63>

The rubber wiper 63 is formed of a rubber being an elastic body absorbing liquids but not holding the same. In this embodiment, three rubble wipers 63 (63A, 63B, and 63C) are provided (see FIG. 7). Note that the number of rubber wipers 63 is not limited to three but is set according to the number of ejection modules 49 of the head 38 described earlier on. Hereinbelow, the three rubber wipers 63A, 63B, and 63C will also be referred to as the rubber wiper 63, collectively.

The rubber wiper 63 is formed into a plate-like shape expanding in the up-down direction and the left-right direction. The rubber wiper 63 is shorter in the oblique direction than the sponge wiper 64 in the oblique direction. By virtue of this, the rubber wiper 63 becomes more likely to flex on contacting with the lower surface 50 of the ejection module 49 in the wiping process. The rubber wiper 63 is a little longer in the left-right direction than the sponge wiper 64 in the left-right direction.

The rubber wiper 63A corresponds to the ejection module 49A, and can face the ejection module 49A in the up-down direction. As depicted in FIGS. 7 and 10A, the rubber wiper 63A is arranged on the upper surface of the second base plate 151 of the main body 61B at an interval from the sponge wiper 64A in the rearward-and-upward orientation. The rubber wiper 63A is positioned on the outside of the first flow channel 153A. The two ends of the rubber wiper 63A in the left-right direction are positioned on the outer side in the left-right direction than the two ends of the sponge wiper 64A in the left-right direction. The rubber wiper 63A is as high as the sponge wiper 64A. The upper end of the rubber wiper 63A is formed to taper. By virtue of this, it becomes easier for the upper end of the rubber wiper 63A to contact with the lower surface 50 of the ejection module 49A in the wiping process.

The rubber wiper 63A is inserted into the slit 187 of the first holder 181 of the wiper holder 61C. The rubber wiper 63A projects upward from the slit 187. The rubber wiper 63A comes to contact with the lower surface of the upper wall 181A of the first holder 181 to prevent itself from departing from the slit 187. By virtue of this, the rubber wiper 63A is held on the upper surface of the second base plate 151 by the first holder 181.

The rubber wiper 63B corresponds to the ejection module 49B, and can face the ejection module 49B in the up-down direction. The rubber wiper 63B is arranged on the upper surface of the second base plate 151 of the main body 61B at an interval from the sponge wiper 64B in the rearward-and-upward orientation. The rubber wiper 63B is positioned on the outside of the first flow channel 153A. The two ends of the rubber wiper 63B in the left-right direction are positioned on the outer side in the left-right direction than the two ends of the sponge wiper 64B in the left-right direction. The rubber wiper 63B is as high as the sponge wiper 64B. The upper end of the rubber wiper 63B is formed to taper. By virtue of this, it becomes easier for the upper end of the rubber wiper 63B to contact with the lower surface 50 of the ejection module 49B in the wiping process.

The rubber wiper 63B is inserted into the slit 187 of the second holder 182 of the wiper holder 61C. The rubber wiper 63B projects upward from the slit 187. The rubber wiper 63B comes to contact with the lower surface of the upper wall 181A of the second holder 182 to prevent itself from departing from the slit 187. By virtue of this, the rubber wiper 63B is held on the upper surface of the second base plate 151 by the first holder 181.

The rubber wiper 63C corresponds to the ejection module 49C, and can face the ejection module 49C in the up-down direction. The rubber wiper 63C is arranged on the upper surface of the second base plate 151 of the main body 61B at an interval from the sponge wiper 64C in the rearward-and-upward orientation. The rubber wiper 63C is positioned on the outside of the downstream portion 153CB of the second flow channel 153C. The two ends of the rubber wiper 63C in the left-right direction are positioned on the outer side in the left-right direction than the two ends of the sponge wiper 64C in the left-right direction. The rubber wiper 63C is as high as the sponge wiper 64C. The upper end of the rubber wiper 63C is formed to taper. By virtue of this, it becomes easier for the upper end of the rubber wiper 63C to contact with the lower surface 50 of the ejection module 49C in the wiping process.

The rubber wiper 63C is inserted into the slit 187 of the third holder 183 of the wiper holder 61C. The rubber wiper 63C projects upward from the slit 187. The rubber wiper 63C comes to contact with the lower surface of the upper wall 181A of the third holder 183 to prevent itself from departing from the slit 187. By virtue of this, the rubber wiper 63C is held on the upper surface of the second base plate 151 by the third holder 183.

<The Cap 62>

As depicted in FIGS. 7 and 9, the cap 62 is supported on the upper surface of the second base plate 151 of the main body 61B. The cap 62 is provided in the form of plurality. In this embodiment, the cap 62 is formed from three caps 62A, 62B, and 62C. Note that the number of caps 62 is not limited to three but is set according to the number of ejection modules 49 of the head 38 described earlier on. Hereinbelow, the three caps 62A, 62B, and 62C will also be referred to as the cap 62, collectively.

The cap 62 is made of an elastic material such as rubber, silicon, or the like. The cap 62 is box-like and open at the top.

The cap 62A corresponds to the ejection module 49A, and can face the ejection module 49A in the up-down direction. The cap 62A is arranged at an interval from the sponge wiper 64A in the frontward-and-downward orientation. A base plate 69 of the cap 62A is formed with an inflow port (not shown) for the liquid cleaner L to flow into the cap 62A, and an outflow port 69A for the liquid cleaner L to flow out of the cap 62A. As depicted in FIGS. 2 and 9, the inflow port is connected to one end of a second supply tube 177. The other end of the second supply tube 177 is connected to the liquid cleaner tank 76, reaching to the outside of the maintenance mechanism 60. The outflow port 69A is connected to one end of a first waste liquid tube 178. The other end of the first waste liquid tube 178 is connected to the waste liquid tank 77, reaching to the outside of the maintenance mechanism 60.

The cap 62B corresponds to the ejection module 49B, and can face the ejection module 49B in the up-down direction. The cap 62B is arranged at an interval from the sponge wiper 64B in the frontward-and-downward orientation. The base plate 69 of the cap 62B is formed with an inflow port (not shown) for the liquid cleaner L to flow into the cap 62B, and an outflow port 69B for the liquid cleaner L to flow out of the cap 62B. The inflow port is connected to one end of a third supply tube 179 branching from the second supply tube 177. The outflow port 69A is connected to one end of a second waste liquid tube 180. The other end of the second waste liquid tube 180 joins into the first waste liquid tube 178, on the outside of the maintenance mechanism 60.

The cap 62C corresponds to the ejection module 49C, and can face the ejection module 49C in the up-down direction. The cap 62C is arranged at an interval from the sponge wiper 64C in the frontward-and-downward orientation. The base plate 69 of the cap 62C is formed with an inflow port (not shown) for the liquid cleaner L to flow into the cap 62C, and an outflow port 69C for the liquid cleaner L to flow out of the cap 62C. The inflow port is connected to one end of a fourth supply tube 201 branching from the second supply tube 177. The outflow port 69A is connected to one end of a third waste liquid tube 202. The other end of the third waste liquid tube 202 joins into the first waste liquid tube 178, on the outside of the maintenance mechanism 60.

A cap cleaning valve 72 is provided (see FIG. 18) at the upstream side of the branching point of the third supply tube 179 and the fourth supply tube 201 of the second supply tube 177. The cap cleaning valve 72 opens and closes the flow channel of the second supply tube 177. To open and close the cap cleaning valve 72 is controlled by the controller 130.

A first suction pump 74 is provided (see FIG. 2) at the downstream side of the joining point of the second waste liquid tube 180 and the third waste liquid tube 202 of the first waste liquid tube 178. To drive the first suction pump 74 is controlled by the controller 130. Note that each of the first waste liquid tube 178, the second waste liquid tube 180, and the third waste liquid tube 202 may be provided with a first suction pump 74.

<The Controller 130>

As depicted in FIG. 18, the controller 130 includes a CPU 131, a flow channel 132, a RAM 133, an EEPROM 134, and an ASIC 135. Those members are all connected on an internal bus 137. The ROM 132 stores programs and the like for the controller 130 to control various operations. The RAM 133 is used as a storing area to temporarily store data and signals used for the CPU 131 to execute the programs, or a working area for data processing. The EEPROM 134 stores settings, graphs, and the like to be kept even after the power is turned off.

The ASIC 135 is connected with the conveyance motor 53, the head motor 54, the first motor 55, the second motor 56, a return pump motor 47, a suction pump motor 58, the shaft motor 59, a valve motor 71, and a valve motor 73.

The ASIC 135 generates a drive signal for rotating each motor, and controls each motor on the basis of the drive signal. Each motor rotates forward or backward depending on the drive signal from the ASIC 135. The controller 130 controls the driving of the conveyance motor 53 to rotate the holder 35, the conveyance roller 36A, the conveyance roller 40A, and the driving roller 102. The controller 130 controls the driving of the head motor 54 to rotate the screw shaft 29A to move the head 38 along the up-down direction. The controller 130 controls the driving of the first motor 55 to rotate the gear 106 of the first support mechanism 51. The controller 130 controls the driving of the second motor 56 to rotate the gear 120 of the second support mechanism 52. The controller 130 controls the driving of the first pump motor 58 to rotate the first suction pump 74. The controller 130 controls the driving of the valve motor 71 to open or close the cap cleaning valve 72. The controller 130 controls the driving of the shaft motor 59 to rotate the first support mechanism 51. The controller 130 controls the driving of a return pump motor 47 to drive the return pump 75.

Further, the ASIC 135 is connected to a piezoelectric element 57. The piezoelectric element 57 is operated by being powered by the controller 130 via an unshown drive circuit. The controller 130 controls applying the power to the piezoelectric element 57 to eject ink droplets selectively from the plurality of nozzles 38A.

Hereinbelow, an explanation will be made on an operation with the maintenance mechanism 60 for the liquid cleaner L to be supplied to the liquid flow channel 153 and then discharged, together with the operations of the maintenance mechanism 60, the first support mechanism 51, and the head 38.

<Movement of the Maintenance Mechanism 60>

As depicted in FIGS. 13 to 15, the maintenance mechanism 60 is movable to the standby position along the oblique direction in the form of sliding on the first support mechanism 51 in the second posture and the second support mechanism 52 and being supported by the first support mechanism 51 and the second support mechanism 52. That is, the first support mechanism 51 and the second support mechanism 52 can support the maintenance mechanism 60 located in the maintenance position, the standby position, and between those two positions.

In particular, the controller 130 first drives the first motor 55. By virtue of this, because the gear 106 rotates clockwise in FIG. 15, the gear 105 rotates counterclockwise such that the maintenance mechanism 60 in the maintenance position moves in the frontward-and-downward orientation to pass over onto the second support mechanism 52 (see FIG. 14).

The controller 130 then drives the second motor 56. By virtue of this, because the gear 120 rotates clockwise in FIG. 14, the gears 118 and 119 rotate counterclockwise such that the maintenance mechanism 60 having moved from the first support mechanism 51 by sliding arrives at the standby position on the second support mechanism 52 (see FIG. 13).

In other words, the maintenance mechanism 60 is movable to the standby position along the oblique direction in the form of sliding on the second support mechanism 52 and being supported by the second support mechanism 52.

As depicted in FIG. 2, the maintenance mechanism 60 in the standby position is positioned at the front side of the leading end 51A of the first support mechanism 51 (the downstream side in the conveyance orientation 8A). In other words, the maintenance mechanism 60 in the standby position is positioned at the opposite side to the shaft 109A of the first support mechanism 51 with respect to the leading end 51A of the first support mechanism 51.

The maintenance mechanism 60 is movable between the standby position and the maintenance position by overpass between the second support mechanism 52 and the first support mechanism 51 in the second posture. The standby position is where the maintenance mechanism 60 has withdrawn from the maintenance position.

As depicted in FIG. 2, the second support mechanism 52 supports the maintenance mechanism 60 in the standby position. As depicted in FIG. 16, the first support mechanism 51 supports the maintenance mechanism 60 in the maintenance position. As depicted in FIG. 14, when the maintenance mechanism 60 passes over between the second support mechanism 52 and the first support mechanism 51 in the second posture, it is supported by both the first support mechanism 51 and the second support mechanism 52. On the other hand, the maintenance mechanism 60 cannot pass over between the second support mechanism 52 and the first support mechanism 51 in the first posture. That is, when the first support mechanism 51 is in the first posture, the maintenance mechanism 60 is not in a position for the first support mechanism 51 and the second support mechanism 52 to support the same at the same time.

As depicted in FIG. 2, the maintenance mechanism 60 in the standby position is supported by the second support mechanism 52. On this occasion, the rack 154 engages both the gears 118 and 119. In this state, if the gear 120 is driven by the second motor 56 (see FIG. 18) to rotate counterclockwise in FIG. 2, then the gears 118 and 119 rotate clockwise in FIG. 2. By virtue of this, the maintenance mechanism 60 in the standby position moves in the rearward-and-upward orientation.

On this occasion, as described above, when the first support mechanism 51 is in the second posture, the first upper surface 117A of the second support mechanism 52 aligns with the first upper surface 111A of the first support mechanism 51 in the oblique direction, the second upper surface 117B of the second support mechanism 52 aligns with the second upper surface 111B of the first support mechanism 51 in the oblique direction, and the upper surface 116A of the second support mechanism 52 aligns with the upper surface 110A of the first support mechanism 51 in the oblique direction.

With the maintenance mechanism 60 being supported only by the first support mechanism 51, and with the shaft motor 59 (see FIG. 18) being driven, the first support mechanism 51 is rotated from the second posture to the first posture. By virtue of this, the maintenance mechanism 60 comes to the maintenance position (see FIG. 16). The maintenance mechanism 60 in the maintenance position is positioned between the head 38 and the first support mechanism 51 in the first posture.

If the maintenance mechanism 60 moves from the maintenance position to the standby position, then the operation opposite to the above is carried out. That is, first, being driven by the shaft motor 59 (see FIG. 18), the first support mechanism 51 rotates from the first posture to the second posture (see FIG. 15). Next, if the first motor 55 and the second motor 56 (see FIG. 18) are driven to rotate the gears 106 and 120 clockwise, then the gears 105, 118 and 119 rotate counterclockwise in FIG. 13. By virtue of this, the maintenance mechanism 60 supported by the first support mechanism 51 in the second posture moves in the frontward-and-downward orientation to reach the standby position (see FIG. 13).

Being supported by the first support mechanism 51 in the first posture, the maintenance mechanism 60 is movable between the maintenance position (an example of the first position) and a wiping position (an example of the second position) by sliding on the first support mechanism 51. The wiping position is at the front side (the standby position side) of the maintenance position. That is, the first support mechanism 51 can support the maintenance mechanism 60 in the maintenance position, the wiping position, and in between those two positions.

As depicted in FIG. 16, the maintenance mechanism 60 in the maintenance position is supported by the first support mechanism 51. On this occasion, the rack 154 engages the gear 105. In this state, if the first motor 55 is driven to rotate the gear 106 clockwise in FIG. 16, then the gear 105 rotates counterclockwise in FIG. 16. By virtue of this, the maintenance mechanism 60 in the maintenance position moves frontward (the downstream in the conveyance orientation 8A) in the front-rear direction (the conveyance orientation 8A) to reach the wiping position (see FIG. 17).

In the course of the maintenance mechanism 60 moving from the maintenance position to the wiping position, the sponge wiper 64 and the rubber wiper 63 move while being in contact with the lower surface 50 of the ejection module 49 of the head 38 in order. That is, the sponge wiper 64 and the rubber wiper 63 slide on the lower surface 50. By virtue of this, the sponge wiper 64 and the rubber wiper 63 wipe the lower surface 50 of the ejection module 49.

When the maintenance mechanism 60 is in the wiping position, if the first motor 55 is driven to rotate the gear 106 counterclockwise in FIG. 15, then the gear 105 rotates clockwise in FIG. 15. By virtue of this, the maintenance mechanism 60 in the wiping position moves rearward (upstream in the conveyance orientation 8A) to reach the maintenance position (see FIG. 16).

<Image Recording Process>

Hereinbelow, an explanation will be made on a process of recording an image on the sheet S (the image recording process).

When the image recording process is not carried out, the image recording apparatus 100 is in the standby state. In the standby state, as depicted in FIG. 16, the head 38 is in the capped position, the first support mechanism 51 is in the first posture supporting the maintenance mechanism 6, and the maintenance mechanism 60 is in the maintenance position. On this occasion, the cap 62 covers the nozzles 38A.

On receiving a command to record an image on the sheet S from an external device such as the operation panel 44, an information processing device, and the like connected with the image recording apparatus 100 on LAN or the like, the controller 130 moves the maintenance mechanism 60 to the standby position from the maintenance position. To describe it in detail, the controller 130 rotates the first support mechanism 51 from the first posture to the second posture (see FIG. 15) and then moves the maintenance mechanism 60 in the frontward-and-downward orientation, such that the maintenance mechanism 60 is moved to the standby position (see FIG. 13).

Next, the controller 130 rotates the first support mechanism 51 from the second posture to the first posture.

Next, the controller 130 moves the head 38 from the capped position to the recording position by way of moving the same downward (see FIG. 19). Then, conveying the sheet S is started and the ink is ejected from the nozzles 38A with the sheet S being positioned right below the head 38. By virtue of this, the image is recorded on the sheet S. The ink attached on the sheet S is fixed on the sheet S by the heat of the heater 39 when the heater 39 passes there. Further, after the recorded image is checked by the CIS 25, the sheet S conveyed there is cut into a predetermined size by the cutter unit 26 and discharged finally.

After the image recording process on the sheet S, if the maintenance mechanism 60 moves to the maintenance position, then the operation opposite to the above is carried out.

In particular, first, the controller 130 drives the shaft motor 59 to change the first support mechanism 51 from the first posture to the second posture (see FIG. 15). On this occasion, the maintenance mechanism 60 is supported by the second support mechanism 52 such that the rack 154 is engaged with both the gears 118 and 119. Under this condition, if the second motor 56 (see FIG. 10) is driven to rotate the gear 120 counterclockwise in FIG. 15, then the gears 118 and 119 rotate clockwise in FIG. 15. By virtue of this, the maintenance mechanism 60 in the standby position moves in the rearward-and-upward orientation (see FIG. 14).

The controller 130 drives the first motor 55. By virtue of this, because the gear 106 rotates counterclockwise in FIG. 14, the gear 105 rotates clockwise such that the maintenance mechanism 60 having moved from the second support mechanism 52 by sliding arrives on the first support mechanism 51 (see FIG. 13).

With the maintenance mechanism 60 being supported by the first support mechanism 51, by driving the shaft motor 59 (see FIG. 10), the first support mechanism 51 rotates from the second posture to the first posture. Then, the head 38 moves from the wiped position to the capped position. By virtue of this, the maintenance mechanism 60 is located in the maintenance position (see FIG. 11). The maintenance mechanism 60 in the maintenance position is positioned between the head 38 and the first support mechanism 51 in the first posture.

<The Purge Process>

Hereinbelow, the purge process for sucking the ink from the nozzles 38A will be explained.

When the image recording process is not carried out, the image recording apparatus 100 is in the standby state. In the standby state, as depicted in FIG. 16, the head 38 is in the capped position, the first support mechanism 51 is in the first posture supporting the maintenance mechanism 6, and the maintenance mechanism 60 is in the maintenance position. On this occasion, the cap 62 covers the nozzles 38A.

In the standby state, the controller 130 carries out the purge process at a predetermined timing or on receiving a command from the outside. The following explanation will be made on the process of the controller 130 receiving the command from the outside to carry out the purge process when the image recording apparatus 100 is in the standby state.

In the purge process, the controller 130 drives the first suction pump 74 with the cap cleaning valve 72 being closed. By virtue of this, the ink in the nozzles 38A is sucked, and discharged from the space formed by the cap 62 and the lower surface 50 of the ejection module 49, to the waste liquid tank 77 via the first waste liquid tube 178, the second waste liquid tube 180, and the third waste liquid tube 202. By virtue of this, the nozzles 38A are prevented from clogging due to solidification of the ink. On this occasion, because the cap cleaning valve 72 is closed, the liquid cleaner L will not be supplied to the caps 62A, 62*b*, and 62C from the liquid cleaner tank 76 via the second supply tube 177, the third supply tube 179, and the fourth supply tube 201.

<The Immersion Process>

The controller 130 carries out the immersion process on receiving a command at a predetermined time or from the outside. Hereinbelow, an explanation will be made on a process when the controller 130 carries out the immersion process after the purge process when the image recording apparatus 100 is in the standby state. After the purge process, the controller 130 carries out the immersion process to immerse the nozzles 38A of the ejection module 49 into the liquid cleaner L. In particular, the controller 130 drives the first suction pump 74 with the cap cleaning valve 72 being opened. By virtue of this, the liquid cleaner L is supplied from the liquid cleaner tank 76 to the caps 62A, 62B, and 62C via the second supply tube 177, the third supply tube 179 and the fourth supply tube 201, to immerse the nozzles 38A of the ejection module 49 into the liquid cleaner L. As a result, the ink attached on the nozzles 38A is dissolved in the liquid cleaner L and discharged to the waste liquid tank 77.

On finishing the immersion process, the controller 130 causes the head 38 to move to an uncapped position and depart from the maintenance mechanism 60 in the maintenance position. Before that, the controller 130 drives the return pump 75 while driving a liquid cleaner flowing valve 84 to close the unshown atmosphere communication channel. By virtue of this, the liquid cleaner L is supplied from the liquid cleaner tank 76 to the supporting stand 61 via the first supply tube 175. The liquid cleaner L supplied to the supporting stand 61 flows into the first flow channel 153A in the liquid flow channel 153 via the inflow port 171. The liquid cleaner L having flowed into the first flow channel 153A flows sequentially through the intermediate flow channel 153B and the second flow channel 153C to be discharged from the outflow port 174. On this occasion, the sponge wipers 64A, 64B, and 64C impregnated with the liquid cleaner L are in a state of sufficiently containing the liquid cleaner L.

The controller 130 drives the liquid cleaner flowing valve 84 to open the atmosphere communication channel 83 while driving the return pump 75. By virtue of this, the impregnating fluid L discharged from the outflow port 174 is returned to the liquid cleaner tank 76 via the return tube 176.

<The Wiping Process>

After the immersion process, the controller 130 carries out the wiping process for the sponge wiper 64 and the rubber wiper 63 to wipe the lower surface 50 of the ejection module 49 of the head 38. In particular, the controller 130 first moves the head 38 upward such that the head 38 may move from the capped position (see FIG. 16) to the wiped position depicted in FIG. 17 with the solid line. By virtue of this, the cap 62 departs from the lower surface 50 of the ejection module 49.

Next, the controller 130 drives the return pump 75. By virtue of this, the liquid cleaner L is supplied to the support 61 from the liquid cleaner tank 76 via the first supply tube 175. The liquid cleaner L supplied to the support 61 passes through the inflow port 171 and flows into the recess 141 of the first flow channel 153A in the flow channel 153. The liquid cleaner L having flowed into the recess 141 of the first flow channel 153A flows on through the recess 141 of the intermediate flow channel 153B and the recess 141 of the third flow channel 153C in order, and finally is discharged from the outflow port 174.

On this occasion, if the liquid surface WS of the liquid cleaner L in the recess 141 of the first flow channel 153A reaches to the position of the lower surface of the sponge wiper 64A and the sponge wiper 64B, then the liquid cleaner L is in contact with the lower surface of the sponge wiper 64A and the sponge wiper 64B, and is sucked into the sponge wiper 64A and the sponge wiper 64B (see FIG. 10A). As a result, the sponge wiper 64A and the sponge wiper 64B are in a state of sufficiently containing the liquid cleaner L. In the same manner, if the liquid surface WS of the liquid cleaner L in the recess 141 of the second flow channel 153C reaches to the position of the lower surface of the sponge wiper 64C, then the liquid cleaner L is in contact with the lower surface of the sponge wiper 64C, and is sucked into the sponge wiper 64C. As a result, the sponge wiper 64C is in a state of sufficiently containing the liquid cleaner L. Note that the return pump 75 may be driven in the purge process or the immersion process. In this way, it is possible to carry out the purge process or the immersion process while letting the sponge wiper 64 contain the liquid cleaner L.

Further, on this occasion, because the liquid cleaner L is stopped from flowing on by the first oblique surface 172, the liquid surface WS is more likely to increase in the recess 141 of the first flow channel 153A. Therefore, the liquid cleaner L is more likely to contact with the sponge wiper 64A and the sponge wiper 64B. Hence, it is easier for the sponge wiper 64A and the sponge wiper 64B to contain the liquid cleaner L sufficiently.

The liquid cleaner L discharged from the outflow port 174 returns to the liquid cleaner tank 76 via the return tube 176.

Next, the controller 130 moves the maintenance mechanism 60 to the wiping position from the maintenance position. To describe it in detail, the maintenance mechanism 60 in the maintenance position is supported by the first support mechanism 51. On this occasion, the rack 154 is engaged with the gear 105. Under this condition, if the first motor 55 is driven to rotate the gear 106 clockwise in FIG. 11, then the gear 105 rotates counterclockwise in FIG. 11. By virtue of this, the maintenance mechanism 60 in the maintenance position moves frontward (downward in the conveyance orientation 8A) along the front-rear direction (the conveyance orientation 8A), and arrives at the wiping position (see FIG. 17). In other words, the controller 130 moves the maintenance mechanism 60 in the front-rear direction such that the maintenance mechanism 60 is moved to the wiping position (see FIG. 17).

In the course of the maintenance mechanism 60 being moved from the maintenance position to the wiping position, the leading ends (the upper ends) of the sponge wiper 64 and the rubber wiper 63 are in contact with the lower surface 50 of the ejection module 49 while sliding on the lower surface 50. In detail, the sponge wiper 64A and the rubber wiper 63A slide on the lower surface 50 of the ejection module 49A, the sponge wiper 64B and the rubber wiper 63B slide on the lower surface 50 of the ejection module 49B, and the sponge wiper 64C and the rubber wiper 63C slide on the lower surface 50 of the ejection module 49C. By virtue of this, the lower surface 50 of the respective ejection modules 49A, 49B, and 49C is wiped. As a result, liquids, foreign substances and the like attached on the lower surface 50 are removed.

With the maintenance mechanism 60 in the wiping position, if the first motor 55 is driven to rotate the gear 106 counterclockwise in FIG. 17, then the gear 105 rotates clockwise in FIG. 17. By virtue of this, the maintenance mechanism 60 in the wiping position moves rearward (upward in the conveyance orientation 8A), and arrives at the maintenance position (see FIG. 16).

The controller 130 drives the shaft motor 59 to change the first support mechanism 51 from the first posture to the second posture. By virtue of this, the impregnating fluid L in the liquid flow channel 153 flows from the first flow channel 153A to the second flow channel 153C and is retained in the second flow channel 153C.

The controller 130 drives the liquid cleaner flowing valve 84 to drive the return pump 75 while opening the unshown atmosphere communication channel. By virtue of this, the impregnating fluid L retained in the second flow channel 153C is discharged from the outflow port 174 to the impregnating fluid tank 76 via the return tube 176.

In other words, the controller 130 moves the head 38 upward to move the same from the wiped position depicted in FIG. 17 with the solid line to an upper withdrawal position depicted in FIG. 17 with the broken line. By virtue of this, the lower surface 50 of the ejection module 49A is positioned above the sponge wiper 64 and the rubber wiper 63.

Next, the controller 130 moves the maintenance mechanism 60 rearward along the front-rear direction to move the maintenance mechanism 60 from the wiping position to the maintenance position. Then, the controller 130 opens an atmosphere open valve (not shown) connected to the liquid cleaner tank 76 to open the liquid cleaner tank 76 to the atmosphere. By virtue of this, the suction force of the return pump 75 causes the liquid cleaner L flowing through the first supply tube 175, the flow channel 153 and the return tube 176, and the liquid cleaner L sucked into the sponge wiper 64 to return to the liquid cleaner tank 76. Finally, the controller 130 stops driving the return pump 75.

Technical Effect of the Embodiment

In the image recording apparatus 100, because the liquid cleaner L flowing through the flow channel 153 flows to contact with the lower surface of the sponge wiper 64 to be sucked into the sponge wiper 64, the sponge wiper 64 sufficiently absorbs and retains the liquid cleaner L. Therefore, the image recording apparatus 100 is downsized as compared to the case of providing a liquid cleaner sink to immerse the sponge wiper 64 into the liquid cleaner L, and a wiper moving mechanism.

In the image recording apparatus 100, because the sponge wiper 64 is not positioned in the recess 141 of the flow channel 153, it is possible to secure the flow of the liquid cleaner L in the recess 141. Because the lower surface of the sponge wiper 64 is supported on the support surface 142 positioned at the upper end of the recess 141, it is possible to let the liquid cleaner L contact with the sponge wiper 64.

In the image recording apparatus 100, because the flow channel 153 has the first barrier wall 143 extending upward from the support surface 142 on the other side than the base surface 141A of the recess 141 in the support surface 142, even if the liquid surface WS of the liquid cleaner L is higher than the support surface 142, the first barrier wall 143 still prevents the liquid cleaner L from flowing out of the flow channel 153.

In the image recording apparatus 100, the rubber wiper 63 positioned outside of the flow channel 153 on the support 61 is in contact with the lower surface 50 of the ejection module 49 in the wiping position. Therefore, it is possible to wipe down the liquid cleaner L from the lower surface 50 cleaned by the sponge wiper 64, while the rubber wiper 63 wipes away foreign substances such as dusts and the like which the sponge wiper 64 failed to wipe away from the lower surface 50. Therefore, the foreign substances wiped down from the lower surface 50 by the rubber wiper 63 are prevented from entering the flow channel 153.

In the image recording apparatus 100, because the liquid surface WS of the liquid cleaner L flowing through the flow channel 153 is higher than the support surface 142 but lower than the upper end of the first barrier wall 143, the liquid cleaner L is more likely to contact with the sponge wiper 64 while the liquid cleaner L is less likely to flow out of the flow channel 153.

In the image recording apparatus 100, the first oblique surface 172 is formed at the downstream side of the sponge wiper 64B in the flowing orientation in the recess 141 of the first flow channel 153A, getting higher from the base surface 141A of the recess 141 as toward the downstream in the flowing orientation. Therefore, the liquid cleaner L flowing through the recess 141 of the first flow channel 153A is stopped from flowing by the first oblique surface 172, such that the liquid surface WS of the liquid cleaner L in the recess 141 of the first flow channel 153A is more likely to become higher. As a result, even if the recess 141 of the first flow channel 153A is deep, the liquid cleaner L still contacts with the lower surface of the sponge wiper 64A and the sponge wiper 64B. Further, by deepening the recess 141 of the first flow channel 153A, when the liquid cleaner L flows into the recess 141 of the first flow channel 153A, it is possible to prevent the liquid cleaner L from flowing out of the flow channel 153.

In the image recording apparatus 100, because the sponge wiper 64A, the sponge wiper 64B, and the sponge wiper 64C are in contact with the liquid cleaner L in the flow channel 153, just with the liquid cleaner L flowing through the flow channel 153 only, the liquid cleaner L is absorbed and retained the sponge wiper 64A, the sponge wiper 64B, and the sponge wiper 64C. Therefore, the image recording apparatus 100 is downsized as compared to the case of providing a liquid cleaner sink and a wiper moving mechanism for each of the sponge wiper 64A, the sponge wiper 64B, and the sponge wiper 64C.

In the image recording apparatus 100, because the flow channel 153 is formed in a U-shape extending in the left-right direction and returning with a U-turn, it is possible to immerse the plurality sponge wipers 64 apart in the conveyance orientation 8A into the liquid cleaner L with the one flow channel 153. Therefore, because the flow channel 153 occupies a small area in the main body 61B of the support 61, the support 61 is downsized.

Before the supporting stand 61 is moved to the standby position from the maintenance position for the sponge wiper to wipe the nozzle surface 50, the return pump 75 is driven to discharge the impregnating fluid L in the liquid flow channel 153. Therefore, it is possible to prevent the impregnating fluid L from leaking out of the liquid flow channel 153 in moving the supporting stand 61.

By driving the return pump 75 to discharge the impregnating fluid L in the liquid flow channel 153 when supporting stand 61 is moved to the standby position from the maintenance position, it is possible to discharge the impregnating fluid L in the liquid flow channel 153 after a certain time has elapsed. Therefore, it is possible to prevent the impregnating fluid L from remaining in the liquid flow channel 153.

By opening the liquid cleaner flowing valve 84 to let the liquid cleaner tank 76 communicate with the outside or close the same off from the outside, it is possible to switch between circulating the impregnating fluid L between the liquid cleaner tank 76 and the liquid flow channel 153, and discharging the same from the liquid flow channel 153 to the liquid cleaner tank 76.

By connecting the plurality of sponge wipers 64 with the one liquid flow channel 153 into a straight array, it is possible to supply the liquid cleaner L to the plurality of sponge wipers 64 at one time.

Letting the first support mechanism 51 put the supporting stand 61 into the second posture, it is possible to slide the supporting stand 61 in an oblique direction.

Because the first support mechanism 51 is changed into the second posture to discharge the liquid cleaner L from the liquid flow channel 153 with the supporting stand 61 being inclined, it is possible to prevent the liquid cleaner L from leaking out of the liquid flow channel 153 when the supporting stand 61 is moving in the inclined state.

Because the first support mechanism 51 is put into the second posture such that the second flow channel 153C of the supporting stand 61 is positioned below the first flow channel 153A, the liquid cleaner L in the liquid flow channel 153 flows from the first flow channel 153A to the second flow channel 153C. Since the liquid cleaner L is retained in the second flow channel 153C, the liquid cleaner L is discharged to the liquid cleaner tank 76 without remaining there due to the return pump 75 positioned in the second flow channel 153C.

Because the liquid cleaner L is supplied to the sponge wiper 64 before the supporting stand 61 moves to the uncapped position, it is possible to secure a sufficient time for immersing the sponge wiper 64 in the liquid cleaner L. By virtue of this, it is possible to reliably immerse the sponge wiper 64 in the liquid cleaner L before wiping the nozzle surface 50. Further, the liquid cleaner L is supplied before the movement to the uncapped position also in the purge process. Therefore, it is possible to reliably immerse the sponge wiper 64 in the liquid cleaner L.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

In the image recording apparatus 100, the flow channel 153 has the support surface 142 supporting the sponge wiper 64. However, the support surface 142 may be omitted. In this case, the flow channel 153 may be a groove formed into an upward U-shape on a cross section cut along a plane orthogonal to the flowing direction. The lower surface of the sponge wiper 64 may be supported at the upper end of the groove, being positioned beyond the upper end of the groove toward the side of the recess 141.

In the image recording apparatus 100, the first oblique surface 172 is formed. However, the first oblique surface 172 may be omitted. In this case, the second oblique surface 173 may also be omitted. In other words, as far as the recess 141 of the flow channel 153 is deep enough for the liquid cleaner L flowing through the recess 141 to contact with the sponge wiper 64, there may be an invariant distance from the upper end 141B to the downstream end 141C.

In the image recording apparatus 100, the flow channel 153 is formed in a U-shape extending in the left-right direction and returning with a U-turn. However, as far as the liquid cleaner L flowing through the recess 141 can contact with the sponge wiper 64, the flow channel 153 is not limited to a U-shape. For example, the flow channel 153 may be formed linearly to extend in the left-right direction.

In the image recording apparatus 100, the sponge wiper 64 has the three sponge wipers 64A, 64B, and 64C. However, the number of sponge wipers 64 is not limited to three as far as it corresponds to the number of ejection modules 49A. For example, the number of sponge wipers 64 may be four or more, or two or less.

In the image recording apparatus 100, the supporter 61 is provided with the three rubber wipers 63A, 63B, and 63C. However, the number of rubber wipers 63 is not limited to three as far as it corresponds to the number of ejection modules 49A. For example, the number of rubber wipers 63 may be four or more, or two or less.

In the image recording apparatus 100, the maintenance mechanism 60 moves frontward from the maintenance position to move to the wiping position. However, the maintenance mechanism 60 may move rearward from the maintenance position to move to the wiping position. In this case, the sponge wiper 64 may be arranged at the rear side of the rubber wiper 63.

In the image recording apparatus 100, in the wiping process, with the head 38 being in the wiped position, the sponge wiper 64 and the rubber wiper 63 move relative to the head 38. However, with the sponge wiper 64 and the rubber wiper 63 being fixed in position, the head 38 may move relative to the sponge wiper 64 and the rubber wiper 63.

In the above explanation, such an example was taken as in the image recording apparatus 100, the maintenance mechanism 60 is supported by the first support mechanism 51 and the second support mechanism 52; when the maintenance mechanism 60 moves between the first support mechanism 51 and the second support mechanism 52, it passes over between the first support mechanism 51 and the second support mechanism 52. However, the present disclosure is not limited to that. For example, the first support mechanism 51 and the second support mechanism 52 may be constructed integrally and can change in posture between the first posture and the second posture, and the maintenance mechanism 60 may be supported thereby.

What is claimed is:

1. A liquid discharge apparatus comprising:
- a head configured to discharge a liquid from a nozzle opening in a nozzle surface;
- a liquid absorbing wiper; and
- a support supporting the liquid absorbing wiper, wherein
- the support is configured to move relative to the head, between a first position and a second position, the liquid absorbing wiper being in contact with the nozzle surface at the first position, and the liquid absorbing wiper being away from the nozzle surface at the second position, the support includes a flow channel configured to flow a liquid cleaner therethrough, and the liquid absorbing wiper is configured to absorb the liquid cleaner from below by contacting with the liquid cleaner flowing in the flow channel.

2. The liquid discharge apparatus according to claim 1, wherein the flow channel is a groove including a first end surface and a second end surface positioned below the first end surface, and the liquid absorbing wiper is supported on the first surface.

3. The liquid discharge apparatus according to claim 2, wherein the groove includes a barrier wall extending from the first end surface toward an opposite side to the second end surface.

4. The liquid discharge apparatus according to claim 3, further comprising a wiper positioned outside the flow channel on the support, wherein the wiper at the first position is in contact with the nozzle surface.

5. The liquid discharge apparatus according to claim 3, wherein a level of the liquid cleaner flowing through the flow channel is higher than the first end surface, and is lower than the upper end of the barrier wall.

6. The liquid discharge apparatus according to claim 2, wherein the groove has an inclined surface which increases in height from the second end surface as toward a downstream in a flowing orientation of the liquid cleaner, at the downstream of the liquid absorbing wiper in the flowing orientation.

7. The liquid discharge apparatus according to claim 1, further comprising another liquid absorbing wiper, wherein the support supports the liquid absorbing wiper and the another liquid absorbing wiper, and the liquid absorbing wiper and the another liquid absorbing wiper are in contact with the liquid cleaner in the flow channel.

8. The liquid discharge apparatus according to claim 7, wherein the flow channel has a U-shape extending in one direction and turning back by a U-turn.

9. The liquid discharge apparatus according to claim 1, further comprising:

a tank configured to retain the liquid cleaner;

a first pump configured to cause the liquid cleaner to flow from the tank to the flow channel;

a driver configured to move the support between a standby position and a maintenance position for the liquid absorbing wiper to wipe the nozzle surface; and a controller, wherein the flow channel extends in the support along the liquid absorbing wiper, and at least a part of the flow channel along the liquid absorbing wiper is open upward, the controller is configured to carry out wiping by putting the support to the maintenance position and driving the first pump to cause the liquid cleaner to flow through the flow channel, and the controller is configured to drive the first pump to discharge the liquid cleaner from the flow channel before moving the support from the maintenance position to the standby position.

10. The liquid discharge apparatus according to claim 9, wherein the controller is configured to move the support from the maintenance position to the standby position, and is configured to drive the first pump to discharge the liquid cleaner from the flow channel.

11. The liquid discharge apparatus according to claim 9, further comprising a valve configured to open and close an atmosphere communication channel connected to the tank and to the outside, wherein the flow channel is configured to circulate the liquid cleaner for the tank, and the controller is configured to open the valve in discharging the liquid cleaner from the flow channel to the tank, and is configured to close the valve in supplying the liquid cleaner from the tank to the flow channel.

12. The liquid discharge apparatus according to claim 9, further comprising two other liquid absorbing wipers, wherein the support supports the liquid absorbing wiper and the two other liquid absorbing wiper, and the flow channel extends to connect the liquid absorbing wiper and the two other liquid absorbing wipers in series.

13. The liquid discharge apparatus according to claim 9, further comprising a supporting member configured to support the support in a slidable manner, wherein the supporting member changes in posture between a first posture and a second posture, an opening of the flow channel facing upward in the first posture, and the opening of the flow channel being inclined to a vertical direction in the second posture.

14. The liquid discharge apparatus according to claim 13, wherein the controller is configured to change the posture of the supporting member from the first posture to the second posture, and is configured to drive the first pump to discharge the liquid cleaner from the flow channel.

15. The liquid discharge apparatus according to claim 13, wherein the flow channel includes a first flow channel located at the upstream of the liquid absorbing wiper, and a second flow channel located at the downstream of the liquid absorbing wiper, the support is inclined such that in the second posture, the second flow channel is positioned below the first flow channel, and the first pump is positioned in the second flow channel.

16. The liquid discharge apparatus according to claim 9, further comprising: a cap supported on the support;

a second pump configured to discharge the liquid cleaner from the cap;

a waste liquid tank; and a waste liquid flow channel connected to the cap and to the waste liquid tank, wherein the support is configured to move between a capped position and uncapped position, the cap being in contact with the nozzle surface of the head at the capped position, and the cap being away from the nozzle surface of the head at the uncapped position, and the controller is configured to carry out:

moving the support to the capped position and driving the second pump, and driving the first pump to supply the liquid cleaner or impregnating fluid to the flow channel before the support moves to the uncapped position.

* * * * *